(12) United States Patent
Yomoda et al.

(10) Patent No.: US 11,813,755 B2
(45) Date of Patent: Nov. 14, 2023

(54) ROBOT CONTROL DEVICE, ROBOT CONTROL METHOD, AND ROBOT CONTROL PROGRAM

(71) Applicant: KOBE STEEL, LTD., Hyogo (JP)

(72) Inventors: Mami Yomoda, Kobe (JP); Yoshiharu Nishida, Kobe (JP); Naoki Kida, Fujisawa (JP); Atsushi Fukunaga, Fujisawa (JP); Kenichiro Kanao, Fujisawa (JP)

(73) Assignee: Kobe Steel, Ltd., Hyogo (JP)

( * ) Notice: Subject to any disclaimer, the term of this patent is extended or adjusted under 35 U.S.C. 154(b) by 434 days.

(21) Appl. No.: 17/253,973

(22) PCT Filed: Jul. 30, 2019

(86) PCT No.: PCT/JP2019/029808
§ 371 (c)(1),
(2) Date: Dec. 18, 2020

(87) PCT Pub. No.: WO2020/027118
PCT Pub. Date: Feb. 6, 2020

(65) Prior Publication Data
US 2021/0268657 A1 Sep. 2, 2021

(30) Foreign Application Priority Data
Aug. 2, 2018 (JP) ................ 2018-146103

(51) Int. Cl.
*B25J 9/16* (2006.01)
*G05B 19/4155* (2006.01)

(52) U.S. Cl.
CPC ........... *B25J 9/1676* (2013.01); *B25J 9/1641* (2013.01); *G05B 19/4155* (2013.01); *G05B 2219/50391* (2013.01)

(58) Field of Classification Search
CPC ...... B25J 9/1676; B25J 9/1666; B25J 9/1674; B25J 9/1653; B25J 9/1633;
(Continued)

(56) References Cited

U.S. PATENT DOCUMENTS

| 2006/0071625 A1 | 4/2006 | Nakata et al. |
| 2007/0244609 A1 | 10/2007 | Kinoshita et al. |

(Continued)

FOREIGN PATENT DOCUMENTS

| EP | 3 351 356 A1 | 7/2018 |
| JP | H03-250307 A | 11/1991 |

(Continued)

OTHER PUBLICATIONS

Notification Concerning Transmittal of International Preliminary Report on Patentability and Translation of Written Opinion of the International Searching Authority; PCT/JP2019/029808 ; dated Feb. 11, 2021.

(Continued)

*Primary Examiner* — Khoi H Tran
*Assistant Examiner* — Tanner L Cullen
(74) *Attorney, Agent, or Firm* — Studebaker & Brackett PC

(57) ABSTRACT

A robot control device according to the present invention is configured to: detect a collision of a robot with an object at a predetermined collision detection sensitivity; perform control of operating the robot, and stopping the robot when a detection part detects the collision; and decrease, when a predetermined circumstance causing the robot to have a low temperature is satisfied, the collision detection sensitivity compared to when the predetermined circumstance is unsatisfied.

16 Claims, 18 Drawing Sheets

(58) Field of Classification Search
CPC ........... G05B 2219/40317; G05B 2219/39082; G05B 19/4061; G05B 2219/39237; G05B 19/4155; G05B 2219/50391
See application file for complete search history.

(56) References Cited

U.S. PATENT DOCUMENTS

| | | |
|---|---|---|
| 2009/0200978 A1 | 8/2009 | Kato et al. |
| 2015/0125767 A1 | 5/2015 | Wake et al. |
| 2021/0039256 A1* | 2/2021 | Yamamoto ............. B25J 9/1666 |

FOREIGN PATENT DOCUMENTS

| | | | | |
|---|---|---|---|---|
| JP | H11-15511 A | | 1/1999 | |
| JP | H1115511 A | * | 1/1999 | ............. B25J 19/06 |
| JP | 2003-025272 A | | 1/2003 | |
| JP | 2006263916 A | * | 10/2006 | ............. B25J 13/00 |
| JP | 2007-286904 A | | 11/2007 | |

OTHER PUBLICATIONS

The extended European search report issued by the European Patent Office dated Dec. 20, 2021, which corresponds to European Patent Application No. 19843354.2-1205 and is related to U.S. Appl. No. 17/253,973.

* cited by examiner

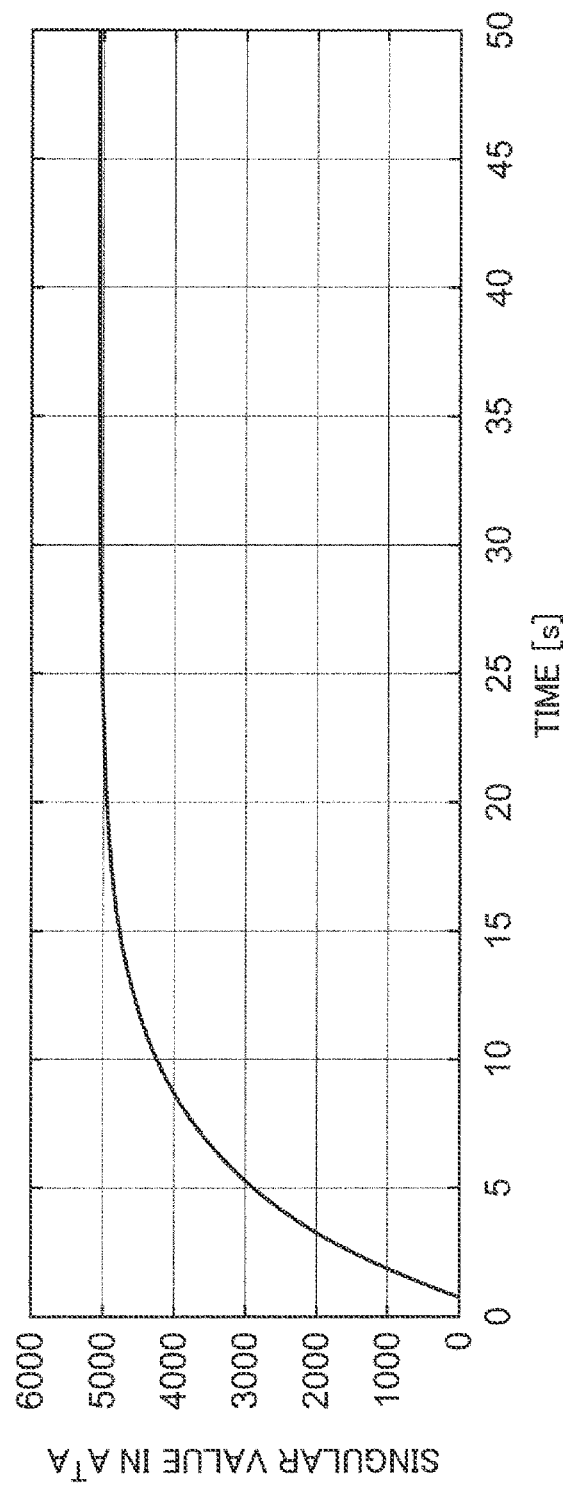

ROBOT CONTROL DEVICE, ROBOT CONTROL METHOD, AND ROBOT CONTROL PROGRAM

TECHNICAL FIELD

The present invention relates to a robot control device, a robot control method, and a robot control program for controlling a robot.

BACKGROUND ART

A known robot control device includes: a necessary drive torque instruction element calculator which calculates elements of a necessary drive torque instruction based on at least one of a position instruction, a speed instruction, and an acceleration instruction; a necessary drive torque calculator which calculates a necessary drive torque by using at least one of a position, a speed, and an acceleration and at least one of the elements of the necessary drive torque instruction calculated by the necessary drive torque instruction element calculator; a threshold calculator which calculates an upper threshold and a lower threshold; and a collision determinator which determines a collision based on the necessary drive torque, the upper threshold, the lower threshold, and an electric current of a motor for driving axial parts of the robot. Besides, the threshold calculator in the robot control device is known to compare a specific value of time that has been stored with an elapsed time output from a timer after a supply source of a motor is turned on, and adopt a first upper threshold and a first lower threshold when the specific value of time is larger than the elapsed time and adopt a second upper threshold and a second lower threshold when the specific value of time is smaller than the elapsed time. The robot control device is further known to include: a parameter estimator which identifies a viscosity friction coefficient and a Coulomb friction coefficient of each of the axial parts online, and transmits the identified friction coefficients of each of the axial parts to the necessary drive torque instruction element calculator and the necessary drive torque calculator; and an identification progress degree determinator which selects the Coulomb friction coefficient and the viscosity friction coefficient of each of the axial parts from parameter identification values input from the parameter estimator, calculates a variation in each of the coefficients, defines an identification progress degree as "1" for the axial part in which both the variation in the actual Coulomb friction coefficient and the variation in the viscosity friction coefficient are equal to or lower than the specific value, and defines the identification progress degree as "0" for the axial part in which at least one of the variation in the actual Coulomb friction coefficient and the variation in the viscosity friction coefficient is equal to or higher than the specific value. It is also known in this case that the threshold calculator sets the upper threshold and the lower threshold obtained after the identification progress of the parameter for the axial part having the identification progress degree of "1" output from the identification progress degree determinator and sets the upper threshold and the lower threshold obtained before the identification progress of the parameter identification for the axial part having the identification progress degree "0" output from the identification progress degree determinator (e.g., see Patent Literature 1).

It is unpreferable to continue operating a robot when the robot collides with an object during the operation of the robot. Therefore, an accurate detection of such a collision of the robot with an object has been demanded. To this end, adoptable is a configuration in which a threshold for determining a collision of the robot with an object is changed depending on whether or not an elapsed time after a power source of a motor is turned on exceeds a specific value. However, in adoption of this configuration under a situation where, for example, a threshold is required to be changed due to a large friction caused by a low temperature of the robot, a possibility of a false detection of a collision increases unless the threshold is changed.

Adoptable is another configuration in which a threshold for determining a collision of the robot with an object is changed depending on whether or not a variation in an estimated value of a friction coefficient reaches a specific value or lower. However, in adoption of this configuration in a specific region causing the robot to have a low temperature, a convergence value based on the estimated value of the friction coefficient changes in accordance with a change in the friction based on a temperature change. Therefore, it is difficult to determine whether or not the estimated value is converged. Consequently, a possibility of a false detection of a collision increases.

CITATION LIST

Patent Literature

Patent Literature 1: Japanese Patent Publication No. 3878054

SUMMARY OF INVENTION

The present invention is aimed at providing a robot control device, a robot control method, and a robot control program for achieving prevention of an increase in a possibility of a false detection of collision.

One aspect of the present invention relates to a robot control device which detects a collision of a robot with an object at a predetermined collision detection sensitivity, performs control of operating the robot, and stopping the robot when the detection part detects the collision, and decreases, when a predetermined circumstance causing the robot to have a low temperature is satisfied, the collision detection sensitivity compared to when the predetermined circumstance is unsatisfied.

BRIEF DESCRIPTION OF DRAWINGS

FIG. 8A is a graph showing a change in a singular value in a matrix $A_k^T A_k$.

DESCRIPTION OF EMBODIMENTS

Figure 1:
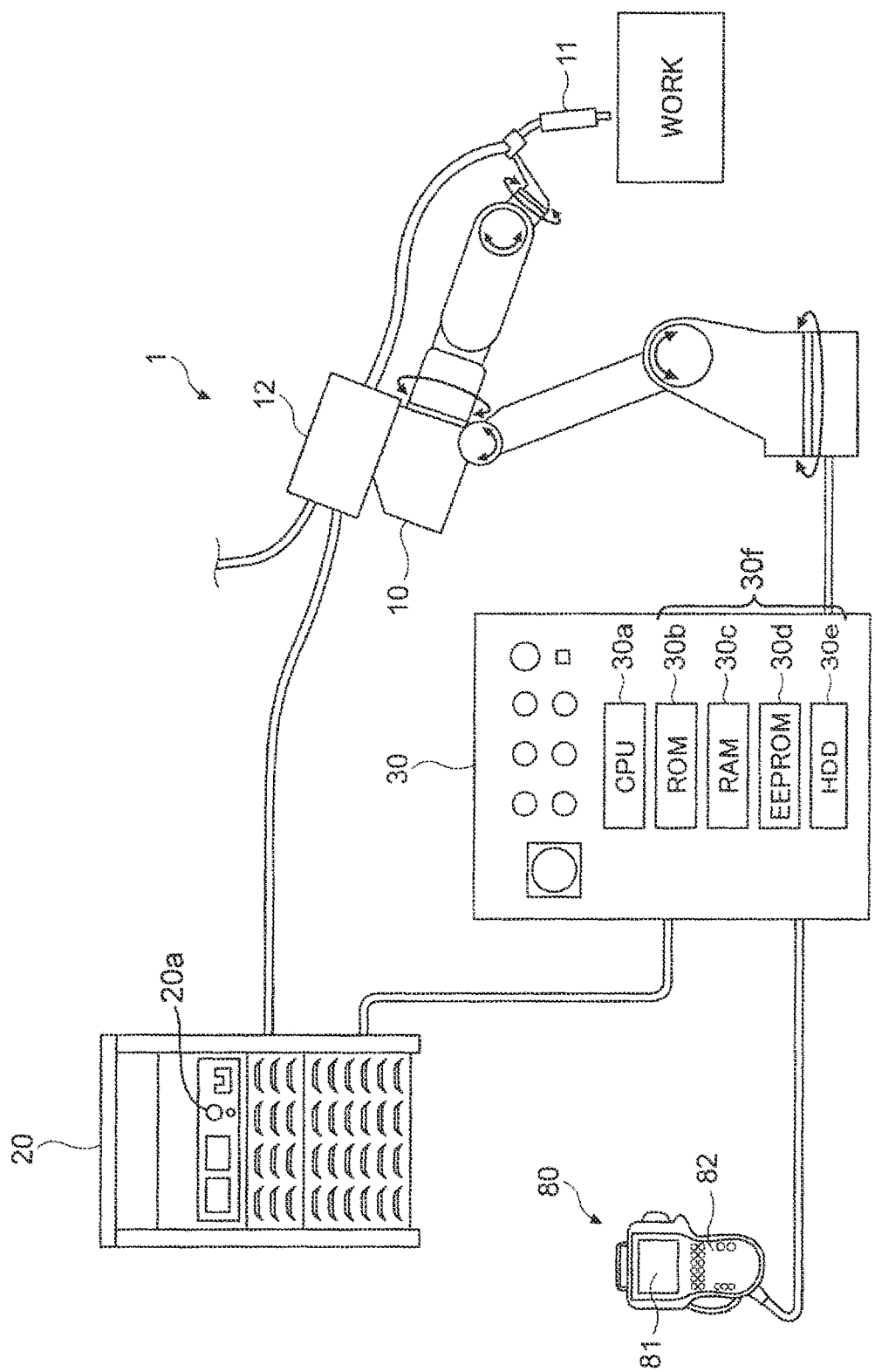
FIG. 1 is a schematic configurational view of a welding robot system in each of the present embodiments.

Hereinafter, each of the embodiments of the present invention will be described with reference to the accompanying drawings. In the drawings, the same components are given the same reference signs, and the descriptions for the same components may be appropriately omitted.

[Configuration of Welding Robot System]

FIG. 1 is a schematic configurational view of a welding robot system 1 in the present embodiments. As shown in FIG. 1, the welding robot system 1 includes a welding robot 10 which executes an arc welding, a welding power source 20 which applies a high voltage to a welding wire attached to the welding robot 10 to generate an arc, a robot controller 30 which controls the welding robot 10 and the welding power source 20, and a teaching device 80 which receives an input of teaching data. The welding robot system 1 is configured so that a power source of the entirety thereof is turned on when a power source switch 20a of the welding power source 20 is turned on.

The welding robot 10 is an arc welding robot, specifically, a vertical articulated robot having six joints (axial parts). In other words, the welding robot 10 serves as an industrial robot having a plurality of joints (six joints in the embodiments as denoted by arrows in FIG. 1) to be driven by a motor. The welding robot 10 can have a desired posture when a servomotor embedded therein drives in response to a necessary drive torque τ' applied thereto from the robot controller 30 to be described later. The welding robot 10 in each of the embodiments has an arm leading end provided with a welding torch 11 for supplying a welding electric current or a shield gas for the welding. A supply device 12 is mounted on the welding robot 10 to convey and provide the welding wire to the welding torch 11.

The robot controller 30 includes a Central Processing Unit (CPU) 30a which executes arithmetic processing for controlling the welding, and a memory 30f. The memory 30f includes a Read Only Memory (ROM) 30b which stores various data and programs to be executed by the CPU 30a, a Random Access Memory (RAM) 30c to be used as a work memory of the CPU 30a, an Electrically Erasable and Programmable Read Only Memory (EEPROM) 30e, and a Hard Disk Drive (HDD) 30e.

The programs stored in the ROM 30b includes, for example, a teaching program containing a target position and a designated speed in connection with movement of the welding torch 11 attached to the welding robot 10. The programs may be stored in the EEPROM 30d or the HDD 30e. The teaching program is creatable and editable through an input operation from the teaching device 80 or an input operation from an unillustrated connection device such as a personal computer.

The robot controller 30 will be described in detail later.

The teaching device 80 is used to receive an input of a welding route, a welding work condition, and the like for teaching the welding robot 10 the work. The teaching device 80 includes a display screen 81 made of liquid crystal, and input buttons 82. Alternatively, the teaching device 80 includes a well-known touch panel of, for example, a capacitance touch type for electrically detecting a position of the panel touched by a finger by detecting a change in a surface charge of the panel having an electric field of a low voltage, or of a resistive touch type for electrically detecting a position touched by a finger in electrodes spaced apart from each other in accordance with a change from a non-conductive state to a conductive state of the position in the electrodes.

First Embodiment

Continuation of operating the welding robot 10 even when the welding robot 10 collides with an object during the operation of the welding robot 10 in the welding robot system 1 may lead to a serious accident or a damage of the welding robot 10. To avoid this, the welding robot system 1 in the first embodiment can perform collision detection of detecting a collision of the welding robot 10 with an object and stopping the welding robot 10 upon the collision.

The collision detection includes determining that the welding robot 10 collides with the object and stopping the welding robot 10 when a collision determination value calculated from a torque difference between an actual torque that is an actually generated torque in the welding robot 10 and an estimated torque that is a sum of estimated values of an inertia force, a centrifugal force, a gravity, a frictional force, and other forces to occur in the welding robot 10 exceeds a collision determination threshold.

Here, the frictional force in a drive part of the welding robot 10 changes based on a temperature. Hence, the collision detection results in a false detection that the welding robot 10 collides with an object when the collision determination value exceeds the collision determination threshold under a situation where the frictional force is larger than usual. Particularly, a large frictional force is caused immediately after activation of the welding robot 10 at a low temperature in the early morning in winter at an extremely cold place. Thus, the collision detection frequently leads to a false detection.

For this reason, in the first embodiment, a collision determination condition in the collision determination for determining that the welding robot 10 collides with an object is changed based on a temperature to reduce the false detection due to the collision detection.

Figure 2:
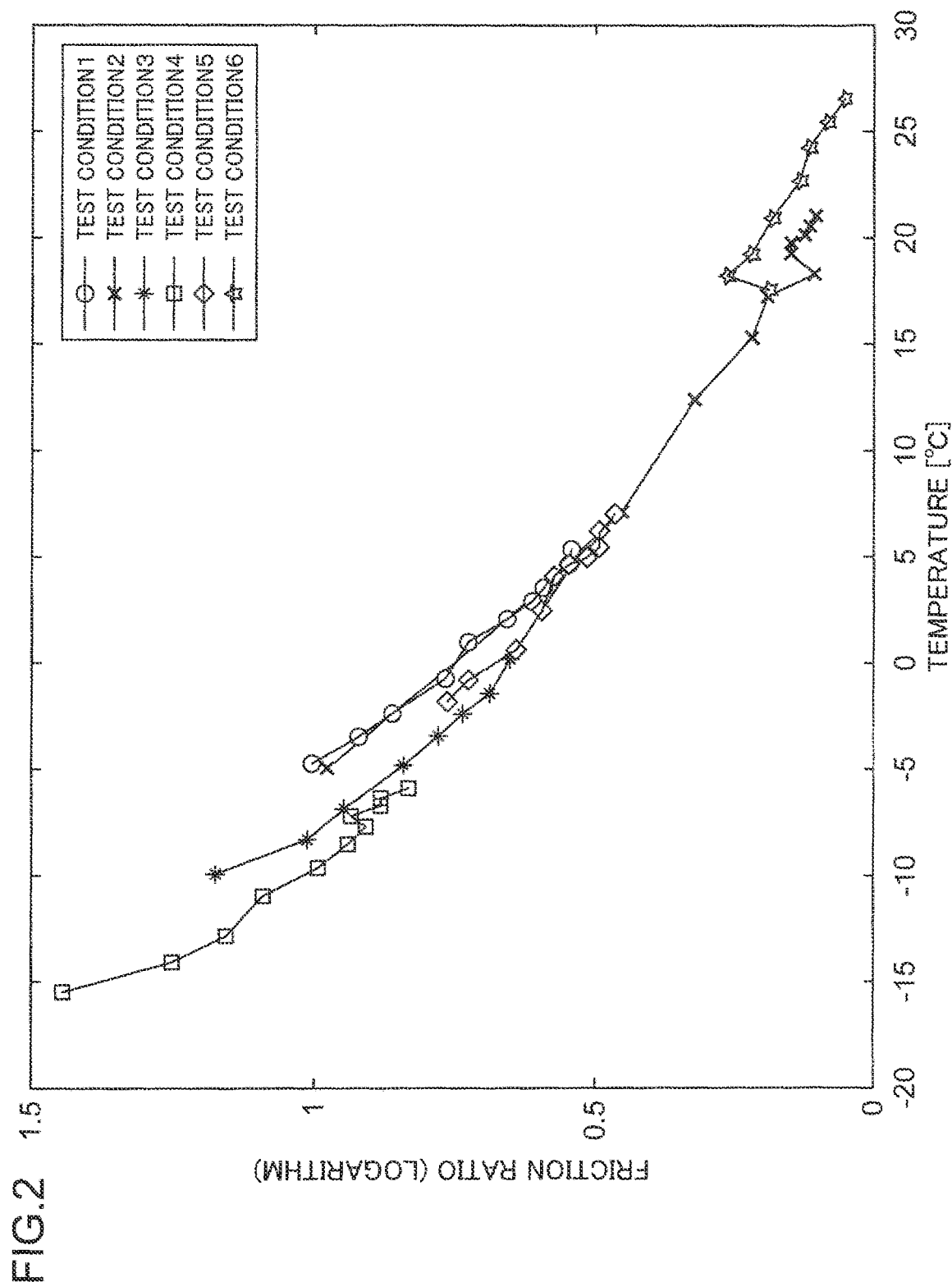
FIG. 2 is a graph showing a relation between a frictional force at a joint of a welding robot and a temperature of a speed reducer of the welding robot.

FIG. 2 is a graph showing a relation between a frictional force at the joint of the welding robot 10 and a temperature of a speed reducer of the welding robot 10. This graph shows results of measurements of a change in the temperature and a change in the frictional force during a continuous operation of an arm wrist of the welding robot 10 in a thermostat chamber. It is seen from this graph that the temperature of the speed reducer of the welding robot 10 is very expressive of the change in the frictional force at the joint of the welding robot 10. Hence, the temperature of the speed reducer of the welding robot 10 is measured, and accordingly the collision determination condition is changed based on the temperature in the first embodiment.

Figure 3:
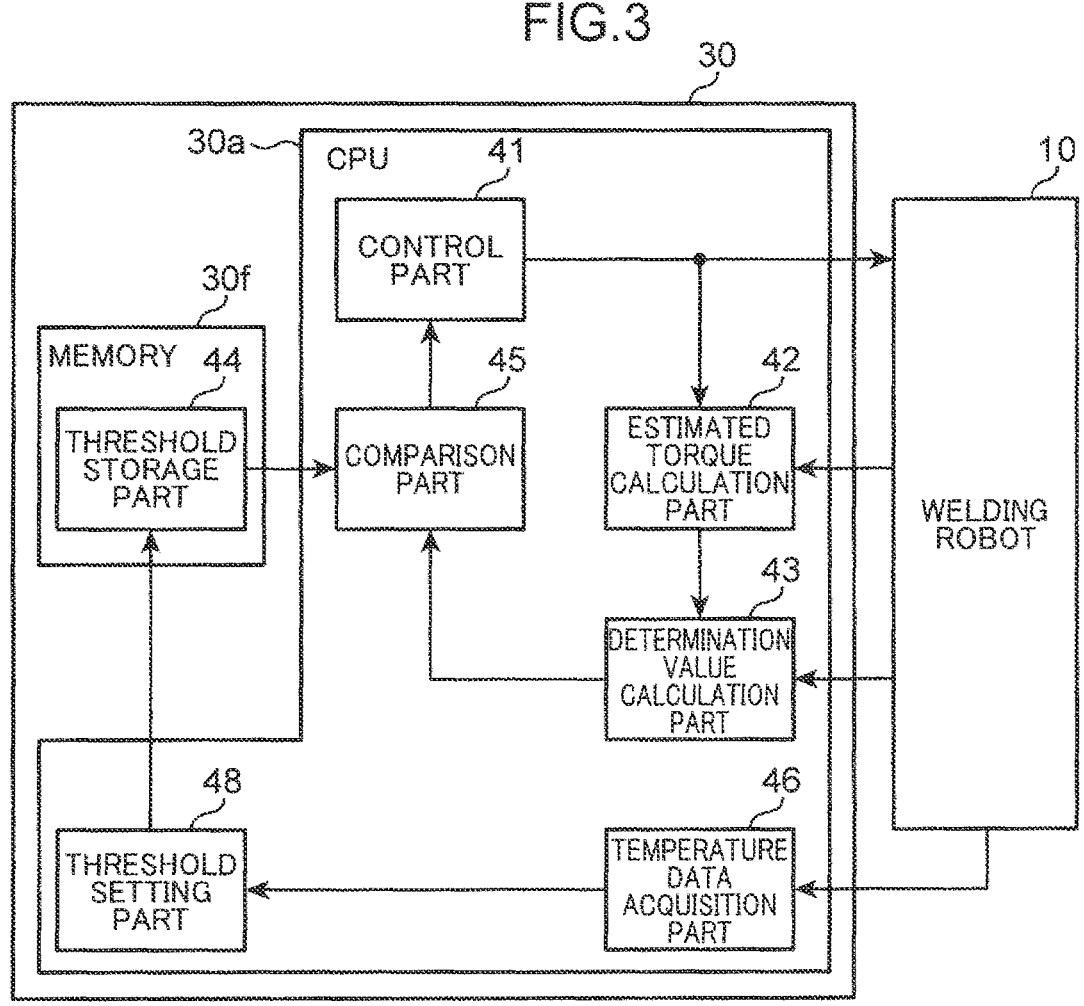
FIG. 3 is a block diagram showing an exemplary configuration of a robot controller according to a first embodiment.

FIG. 3 is a block diagram showing an exemplary configuration of the robot controller 30 according to the first embodiment. As shown in FIG. 3, the memory 30f of the robot controller 30 includes a threshold storage part 44. The threshold storage part 44 is incorporated in, for example, the RAM 30c (FIG. 1) or the EEPROM 30d (FIG. 1) of the memory 30f. The CPU 30a of the robot controller 30 serves as a control part 41, an estimated torque calculation part 42, a determination value calculation part 43, a comparison part 45, a temperature data acquisition part 46, and a threshold setting part 48 by reading a program stored in the ROM 30b (FIG. 1) in the first embodiment into the RAM 30c (FIG. 1) and executing the program.

The program for executing the corresponding operation in the robot controller 30 in the first embodiment may be provided from an external part through a communication therewith, or stored in a recording medium such as a Digital Versatile Disc-Read Only Memory (DVD-ROM) or a flush memory and then provided.

The control part 41 reads in a model (a dynamic character) of the welding robot 10 that is stored in, for example, the ROM 30b (FIG. 1) or the EEPROM 30d (FIG. 1) of the memory 30f, calculates a necessary drive torque at each of the joints (the axial parts) for a desired operation with respect to the read in model, and applies the necessary drive torque to the welding robot 10. In this way, the welding robot 10 moves in response to the necessary drive torque from the control part 41. Thereafter, an angle of each of the joints detected by an encoder of the motor of the welding robot 10 is fed back to the robot controller 30. The control part 41 processes the necessary drive torque as zero to stop operating the welding robot 10 when receiving, from the comparison part 45, a notice indicating the collision of the welding robot 10 with an object. In the embodiment, the control part 41 corresponds to an exemplary robot control part.

The estimated torque calculation part 42 periodically calculates an estimated torque that is a sum of estimated values of an inertia force, a centrifugal force, a gravity, a frictional force and other forces to occur at the joint based on the necessary drive torque input from the control part 41 to the servomotor and the joint angle input from the encoder of the welding robot 10. The estimated torque calculation part 42 notifies the determination value calculation part 43 of the calculated estimated torque.

The determination value calculation part 43 calculates a collision determination value to be used for determining a detection of the collision from the torque difference between the estimated torque calculated by the estimated torque calculation part 42 and the actual torque output from the welding robot 10, and outputs the calculated collision determination value to the comparison part 45.

The threshold storage part 44 stores a collision determination threshold to be used for determining the detection of the collision.

The comparison part 45 compares the collision determination value calculated by the determination value calculation part 43 with the collision determination threshold stored in the threshold storage part 44, and determines whether or not the welding robot 10 collides with the object based on the comparison result. Specifically, the comparison part 45 determines that the welding robot 10 collides with the object when the collision determination value is larger than the collision determination threshold, and determines that the welding robot 10 does not collide with the object when the collision determination value is equal to or smaller than the collision determination threshold. When determining that the welding robot 10 collides with the object, the comparison part 45 notifies the control part 41 of the collision. In the embodiment, the comparison part 45 corresponds to an exemplary detection part. In other words, the comparison part 45 detects the collision of the welding robot 10 with the object at a predetermined collision detection sensitivity depending on the collision determination threshold.

The temperature data acquisition part 46 acquires temperature data indicating the temperature of the speed reducer of the welding robot 10. The temperature data acquisition part 46 notifies the threshold setting part 48 of the acquired temperature data. An internal temperature (e.g., a grease temperature) or a surface temperature of the speed reducer may be adopted as the temperature of the speed reducer. Alternatively, a temperature of a cover for the speed reducer may be adopted from the perspective of easy attachment of a temperature sensor to the cover. As another option, an encoder adapted for acquiring the temperature may be adopted as an encoder for the speed reducer.

The threshold setting part 48 sets the collision determination threshold in the threshold storage part 44 based on the temperature indicated in the temperature data acquired by the temperature data acquisition part 46. In the first embodiment, the threshold setting part 48 corresponds to an exemplary detection control part. Ways of setting the collision determination threshold includes, for example, the following ways.

A first way includes setting a normal threshold as the collision determination threshold when the temperature indicated in the temperature data acquired by the temperature data acquisition part 46 is equal to or higher than a reference temperature, and setting a threshold larger than the normal threshold as the collision determination threshold when the temperature indicated in the temperature data acquired by the temperature data acquisition part 46 is lower than the reference temperature. In this case, regarding the relation (e.g., FIG. 2) between the frictional force and the temperature each measured in advance, a certain temperature or lower at which a difference between an actual frictional force and a reference frictional force equals to or larger than a frictional difference estimated under the normal threshold may be defined as the reference temperature.

A second way includes setting a threshold calculated from the temperature data acquired by the temperature data acquisition part 46 as the collision determination threshold. Regarding the relation (e.g., FIG. 2) between the frictional force and the temperature each measured in advance, such a threshold as not to exceed the collision determination value in a normal operation may be calculated as a value which lineally changes with respect to the temperature. For example, the threshold may be calculated by using the following threshold calculation equation:

(Threshold)=$a$×(Temperature)+$b$, where each of coefficients "a" and "b" represents a selective constant. However, the threshold is required to be larger as the temperature is lower, and thus the coefficient "a" is defined as a<0. Here, a decreasing linear function is used as the threshold calculation equation here, but other function such as a quadratic function with decreasing intervals may be used.

A third way includes setting the normal threshold as the collision determination threshold when the temperature indicated in the temperature data acquired by the temperature data acquisition part 46 is equal to or higher than the reference temperature, and setting the threshold calculated from the temperature data as the collision determination threshold when the temperature indicated in the temperature data acquired by the temperature data acquisition part 46 is lower than the reference temperature. In this case, regarding the relation (e.g., FIG. 2) between the frictional force and the temperature each measured in advance, a certain temperature or lower at which a difference between an actual frictional force and a reference frictional force is equal to or larger than a frictional difference estimated under the normal threshold may be defined as the reference temperature. When the temperature is lower than the reference temperature, the threshold may be set, for example, by using the aforementioned threshold calculation equation. However, the threshold is required to be larger as the temperature is lower. Hence, it is necessary to determine the values of the coefficients "a" and "b" so that the threshold obtained by using the aforementioned threshold calculation equation where the temperature is defined as the reference temperature becomes equal to or larger than the normal threshold.

A fourth way includes setting the threshold calculated from the temperature data as the collision determination threshold when the temperature indicated in the temperature data acquired by the temperature data acquisition part 46 is equal to or higher than the reference temperature, and setting a threshold larger than the normal threshold as the collision determination threshold when the temperature indicated in the temperature data acquired by the temperature data acquisition part 46 is lower than the reference temperature. However, the threshold is required to be larger as the temperature is lower. Hence, it is necessary to determine the values of the coefficients "a" and "b" so that the threshold obtained by using the threshold calculation equation where the temperature is defined as the reference temperature becomes equal to or smaller than the threshold larger than the normal threshold.

The collision sensitivity of the comparison part 45 is decreased when the threshold larger than the normal threshold is set as the collision determination threshold by the threshold setting part 48 with use of any one of the first to fourth ways, compared to when the normal threshold is set as the collision determination threshold.

In the first embodiment, the temperature indicated in the temperature data acquired by the temperature data acquisition part 46 is an exemplary measurement temperature that is an actually measured temperature of the robot. The circumstance that the temperature indicated in the temperature data acquired by the temperature data acquisition part 46 is low is an exemplary predetermined circumstance causing the robot to have a low temperature.

The estimated torque calculation part 42 may use the temperature data acquired by the temperature data acquisition part 46 when calculating the estimated torque, even though such use of the temperature data for the calculation by the estimated torque calculation part 42 is not mentioned heretofore. Specifically, the estimated torque calculation part 42 may use the temperature data acquired by the temperature data acquisition part 46 for estimation of the frictional force when obtaining the estimated torque, thereby calculating a more accurate estimated friction value. Ways of calculating the estimated friction value include, for example, the following ways.

A first way includes, for example, causing the ROM 30b of the memory 30f to hold a table showing the relation between the frictional force and the temperature each measured in advance, and allowing the estimated torque calculation part 42 to read out, from the table in the memory 30f, a value of the frictional force corresponding to the temperature data acquired by the temperature data acquisition part 46 and to use the read out value of the frictional force.

A second way includes, for example, causing the ROM 30b of the memory 30f to hold a friction model created to represent the temperature as a variable by making the relation between the frictional force and the temperature each measured in advance approximate, and allowing the estimated torque calculation part 42 to calculate an estimated friction value from the temperature data acquired by the temperature data acquisition part 46 and the friction model in the memory 30f. For instance, the friction model may be approximated by the following equation:

$$\text{Log(Estimated Friction Value)} = c \times \text{(Temperature)} + d,$$

where each of the coefficients "c" and "d" represents a selective constant.

Figure 4:
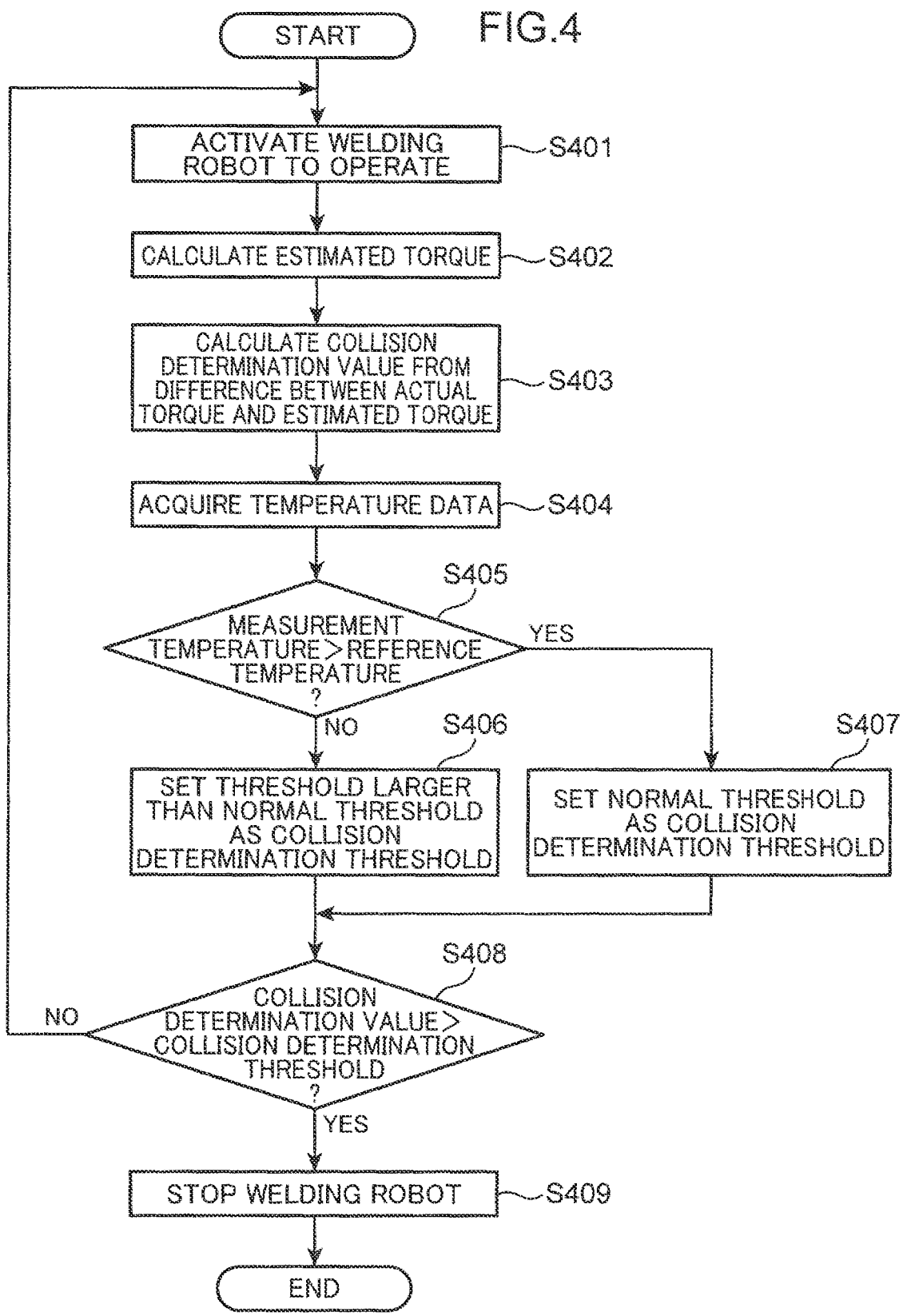
FIG. 4 is a flowchart showing an exemplary operation of the robot controller according to the first embodiment.

FIG. 4 is a flowchart showing an exemplary operation of the robot controller 30 according to the first embodiment.

As shown in FIG. 4, in the robot controller 30, the control part 41 first controls the welding robot 10 by way of a motor drive to achieve a predetermined operation after activating the welding robot 10 (step S401).

Subsequently, the estimated torque calculation part 42 estimates an inertia force, a centrifugal force, a frictional force, and other forces to occur in the welding robot 10, and calculates an estimated torque (step S402).

Next, the determination value calculation part 43 calculates a collision determination value from a torque difference between an actual torque representing a measurement value of an actually generated torque in the welding robot 10 and the estimated torque calculated in step S402 (step S403).

Meanwhile, in the robot controller 30, the temperature data acquisition part 46 acquires temperature data indicating the temperature of the speed reducer of the welding robot 10 that is measured by the temperature sensor (step S404).

Then, the threshold setting part 48 sets a collision determination threshold in the threshold storage part 44 based on a measurement temperature indicated in the temperature data acquired in step S404. Here, the threshold setting part 48 sets the collision determination threshold for determining that a collision occurs when a collision determination value exceeds the collision determination threshold. Specifically, the threshold setting part 48 first determines whether or not the measurement temperature indicated in the temperature data acquired in step S404 is higher than a reference temperature (step S405). When the measurement temperature indicated in the temperature data acquired in step S404 is determined not to be higher than the reference temperature, that is, the measurement temperature is determined to be equal to or lower than the reference temperature (NO in step S405), the threshold setting part 48 sets a threshold larger than a normal threshold as the collision determination threshold (step S406). Conversely, when the measurement temperature indicated in the temperature data acquired in step S404 is determined to be higher than the reference temperature (YES in step S405), the threshold setting part 48 sets the normal threshold as the collision determination threshold (step S407).

Thereafter, the comparison part 45 compares the collision determination value calculated in step S403 with the collision determination threshold set in step S406 or S407, and determines whether or not the collision determination value exceeds the collision determination threshold (step S408). When the collision determination value is determined not to exceed the collision determination threshold (NO in step S408), the flow returns to step S401 so that the control part 41 continues operating the welding robot 10. Conversely, when the collision determination value is determined to exceed the collision determination threshold (NO in step S405), the control part 41 stops the welding robot 10 (step S409), and the flow finishes there.

In the exemplary operation, the robot controller 30 executes steps S404 to S407 after the execution of steps S402 to S403. However, the execution sequence should not be limited thereto. The robot controller 30 may execute steps S402 to S403 in parallel to steps S404 to S407, or may execute steps S402 to 403 after the execution of steps S404 to S407.

Meanwhile, each of an input to the motor for the calculation of the estimated torque by the estimated torque calculation part 42 in step S402 and the actual torque for the calculation of the collision determination value by the determination value calculation part 43 in step S402 contains a noise in many cases. To avoid such a noise, a disturbance estimation observer may directly estimate a disturbance torque. The disturbance estimation observer has a well-known configuration, and estimates a disturbance torque that is a combination of a load torque based on the centrifugal force, the frictional force and other forces, and a variation torque based on a variation in an inertia moment and a torque ripple of the motor. In this case, in FIG. 3, the disturbance estimation observer is preferably provided in place of the estimated torque calculation part 42. In FIG. 4, steps S402 and S403 may be changed so that the disturbance estimation observer estimates the disturbance torque in step S402, and the disturbance torque estimated in step S402 is defined as the collision determination value in step S403, respectively.

Conclusively, according to the first embodiment, the collision determination threshold is increased when the measurement temperature of the robot 10 is equal to or lower than the reference temperature under the situation where, for example, the threshold is required to be changed due to a large friction caused by a low temperature of the robot 10. This consequently makes it possible to prevent an increase in the possibility of a false detection of a collision.

Second Embodiment

A welding robot system 1 according to a second embodiment also can perform collision detection of detecting a collision of a welding robot 10 with an object and stopping the welding robot 10 upon the collision in the same manner as the welding robot system 1 in the first embodiment. However, in the second embodiment, a change in a friction based on an operational state or a temperature is estimated by using a forgetting factor recursive least squares way.

Figure 5:
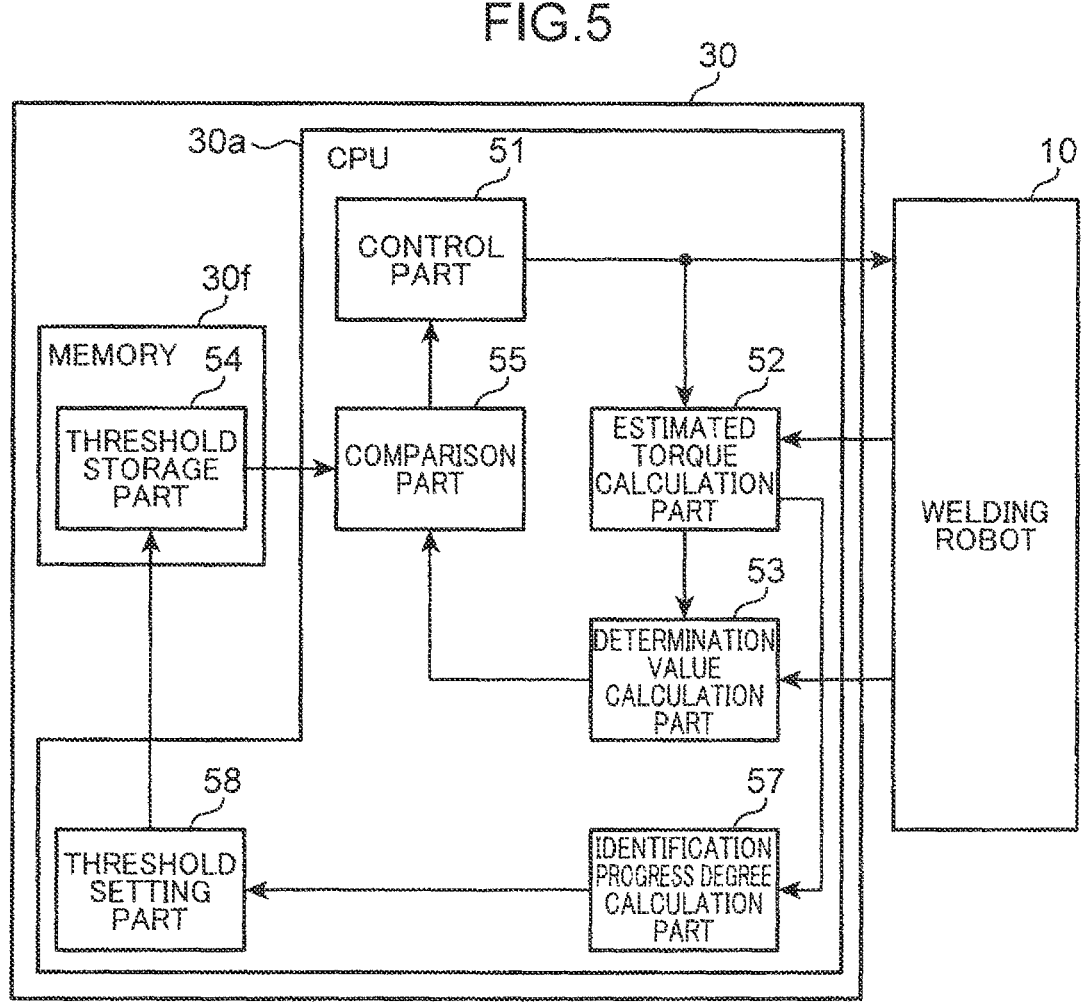
FIG. 5 is a block diagram showing an exemplary configuration of a robot controller according to a second embodiment.

FIG. 5 is a block diagram showing an exemplary configuration of a robot controller 30 according to the second embodiment. As shown in FIG. 5, a memory 30f of the robot controller 30 includes a threshold storage part 54. The threshold storage part 54 is incorporated in, for example, a RAM 30c (FIG. 1) or an EEPROM 30d (FIG. 1) of the memory 30f. A CPU 30a of the robot controller 30 serves as a control part 51, an estimated torque calculation part 52, a determination value calculation part 53, a comparison part 55, an identification progress degree calculation part 57, and a threshold setting part 58 by reading a program stored in a ROM 30b (FIG. 1) in the second embodiment into the RAM 30c (FIG. 1) and executing the program.

The program for executing the corresponding operation in the robot controller 30 in the second embodiment may be provided from an external part through a communication therewith, or stored in a recording medium such as a DVD-ROM or a flush memory and then provided.

The control part 51 reads in a model (a dynamic character) of the welding robot 10 that is stored in, for example, the ROM 30b (FIG. 1) or the EEPROM 30d (FIG. 1) of the memory 30f, calculates a necessary drive torque at each of joints (axial parts) for a desired operation with respect to the read in model, and applies the necessary drive torque to the welding robot 10. In this way, the welding robot 10 moves in response to the necessary drive torque from the control part 51. Thereafter, an angle of each of the joints detected by an encoder of the motor of the welding robot 10 is fed back to the robot controller 30. The control part 51 processes the necessary drive torque as zero to stop operating the welding robot 10 when receiving, from the comparison part 55, a notice indicating the collision of the welding robot 10 with an object. In the embodiment, the control part 51 corresponds to an exemplary control part.

The estimated torque calculation part 52 periodically calculates an estimated torque that is a sum of estimated values of an inertia force, a centrifugal force, a gravity, a frictional force and other forces to occur at the joint based on the necessary drive torque input from the control part 51 to the servomotor and the joint angle input from the encoder of the welding robot 10.

A torque caused in the motor of the welding robot 10 by the necessary drive torque input from the control part 51 is defined as "τ", a motor angle of the welding robot 10 attributed to the necessary drive torque input from the control part 51 is defined as "θ". Here, the torque τ is expressed by the following formula:

$$\tau = f\left(\theta, \frac{d\theta}{dt}, \frac{d^2\theta}{dt^2}\right) + Fr\left(\frac{d\theta}{dt}\right) + d.$$

In the formula, the second term "Fr (dθ/dt)" on the right side represents the frictional force, the first term "f (θ, dθ/dt, $d^2\theta/dt^2$)" on the right side represents estimated values of the inertia force, the centrifugal force, and other forces except for the frictional force, and the third term "d" on the right side represents a disturbance term.

Under the definition of "Fr (dθ/dt)+d=D", "D" can be calculated from the following formula:

$$D = \tau - f\left(\theta, \frac{d\theta}{dt}, \frac{d^2\theta}{dt^2}\right).$$

Only each of the Coulomb friction and the viscosity friction is presumed to act as the frictional force. Besides, the Coulomb friction is defined as "F" and the viscosity friction is defined as "B". In this case, the term "Fr (dθ/dt)" is further expressed by the following formula:

$$Fr\left(\frac{d\theta}{dt}\right) = F\mathrm{sign}\left(\frac{d\theta}{dt}\right) + B\frac{d\theta}{dt}.$$

Here, the estimate torque calculation part 52 identifies a friction model by using the forgetting factor recursive least squares way, and calculates an estimated value of each of the Coulomb friction coefficient F and the viscosity friction coefficient B.

Specifically, a motor angle in a time step k is defined as "$\theta_k$", a disturbance containing a friction in the time step k is defined as "$D_k$", and a matrix $A_k$ and a matrix $B_k$ are defined by the following formula:

$$A_k = \begin{bmatrix} \rho A_{k-1} \\ \operatorname{sign}\left(\dfrac{d\theta_k}{dt}\right) & \dfrac{d\theta_k}{dt} \end{bmatrix}.$$

$$B_k = \begin{bmatrix} \rho B_{k-1} \\ D_k \end{bmatrix}$$

In the matrix, the coefficient ρ represents a forgetting coefficient. The matrix $A_0$ and the matrix $B_0$ are defined by the following formula:

$$A_0 = \begin{bmatrix} \operatorname{sign}\left(\dfrac{d\theta_0}{dt}\right) & \dfrac{d\theta_0}{dt} \end{bmatrix}.$$

$$B_0 = D_0$$

The estimated value of the Coulomb friction coefficient F in the time step k is defined as "$\hat{F}_k$", and the estimated value of the viscosity friction coefficient B in the time step k is defined as "$\hat{B}_k$", respectively. Under the definitions, the matrix $X_k$ is further defined by the following formula, where the hat symbol is given above the relevant character in the formula while being given after the relevant character in the description:

$$X_k = \begin{bmatrix} \hat{F}_k \\ \hat{B}_k \end{bmatrix}.$$

Thus, the friction model is expressed by the following formula:

$$A_k X_k = B_k$$

Accordingly, the matrix $X_k$ can be identified by the following formula with use of the least squares way:

$$X_k = (A_k^T A_k)^{-1} A_k^T B_k.$$

From these perspectives, the estimated frictional force $\hat{Fr}_k$ ($d\theta_k/dt$) in the time step k is expressed by the following formula:

$$\hat{Fr}_k\left(\dfrac{d\theta_k}{dt}\right) = \hat{F}_k \operatorname{sign}\left(\dfrac{d\theta_k}{dt}\right) + \hat{B}_k \dfrac{d\theta_k}{dt}.$$

Consequently, the estimated torque $\hat{\tau}_k$ can be calculated by the following formula:

$$\hat{\tau}_k = f\left(\theta_k, \dfrac{d\theta_k}{dt}, \dfrac{d^2\theta_k}{dt^2}\right) + \hat{Fr}_k\left(\dfrac{d\theta_k}{dt}\right).$$

The estimated torque calculation part 52 notifies the determination value calculation part 53 of the calculated estimated torque.

The determination value calculation part 53 calculates a collision determination value to be used for determining detection of a collision from a torque difference between the estimated torque calculated by the estimated torque calculation part 52 and an actual torque output from the welding robot 10, or from a value obtained by filtering the torque difference to avoid a false detection caused by a high frequency noise, and outputs the calculated collision determination value to the comparison part 55.

The actual torque is not limited to, for example, a torque measured by a torque sensor. For instance, the necessary drive torque input from the control part 51 to the welding robot 10 may be adopted as the actual torque. In this case, it is unnecessary to include the torque sensor. Alternatively, the memory 30f may hold a preliminarily obtained correlation between a value of the electric current to be supplied to a servomotor and a torque to be generated at each of joints of the welding robot 10, and the torque sensor may detect the value of the electric current to be supplied to the servomotor. A torque converted from the detected value of the electric current with use of the correlation may be adopted as the actual torque.

The threshold storage part 54 stores a collision determination threshold to be used for determining the detection of the collision.

The comparison part 55 compares the collision determination value calculated by the determination value calculation part 53 with the collision determination threshold stored in the threshold storage part 54, and determines whether or not the welding robot 10 collides with the object based on the comparison result. Specifically, the comparison part 55 determines that the welding robot 10 collides with the object when the collision determination value is larger than the collision determination threshold, and determines that the welding robot 10 does not collide with the object when the collision determination value is equal to or smaller than the collision determination threshold. When determining that the welding robot 10 collides with the object, the comparison part 55 notifies the control part 51 of the collision. In the embodiment, the comparison part 55 corresponds to an exemplary detection part. In other words, the comparison part 55 detects the collision of the welding robot 10 with the object at a predetermined collision detection sensitivity depending on the collision determination threshold.

The identification progress degree calculation part 57 calculates a progress degree of identification of a friction model based on the friction model identified by the estimated torque calculation part 52. For instance, the model of the welding robot 10 is expressed by the following formula:

$$J\dfrac{d^2\theta}{dt^2} + F\operatorname{sign}\left(\dfrac{d\theta}{dt}\right) + B\dfrac{d\theta}{dt} = \tau \qquad (1)$$

In Formula (1), the first term "$Jd^2\theta/dt^2$" on the left side represents an inertia term. The forgetting coefficient ρ is defined as ρ=0.9999

Figure 6:
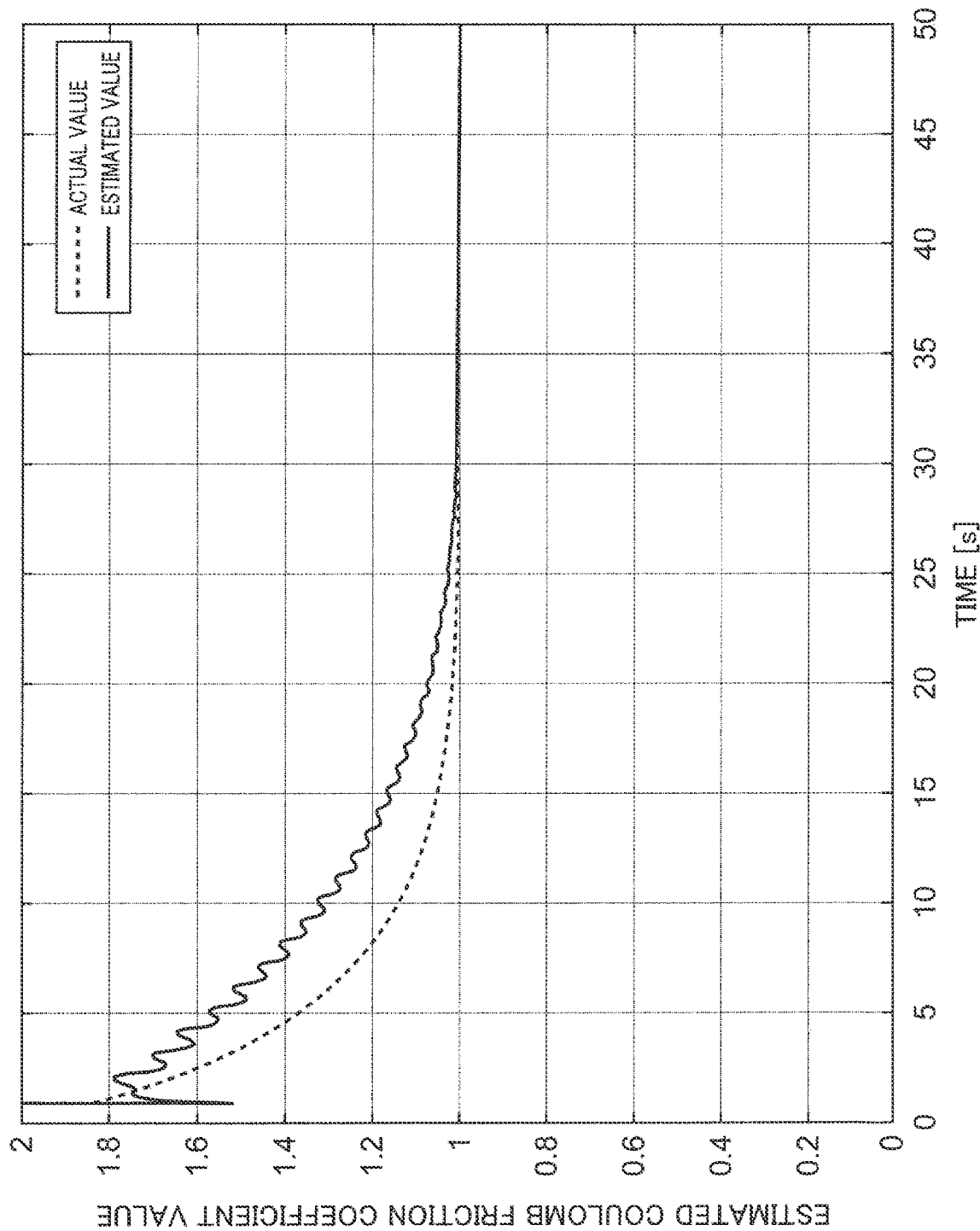
FIG. 6 is a graph showing a change in an estimated Coulomb friction coefficient value in accordance with a chronological change in a Coulomb friction coefficient from 2 to 1.
Figure 7:
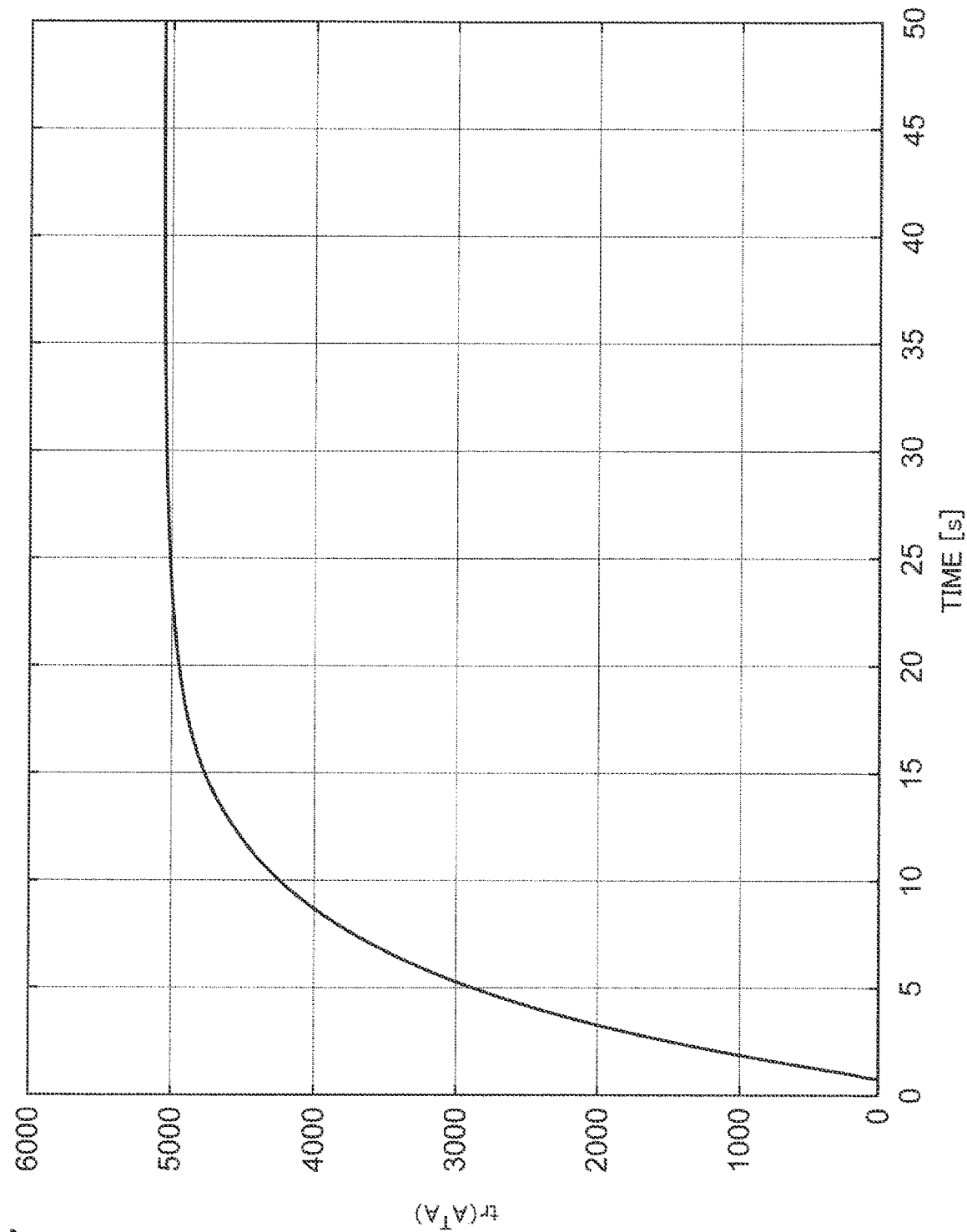
FIG. 7 is a graph showing a change in a trace tr $(A_k^T A_k)$.

FIG. 6 is a graph showing a change in an estimated Coulomb friction coefficient value $\hat{Fr}_k$ in accordance with a chronological change in the Coulomb friction coefficient F from 2 to 1. FIG. 7 is a graph showing a change in a trace tr ($A_k^T A_k$) in a matrix ($A_k^T A_k$) obtained by the friction model $A_k X_k = B_k$ identified by the estimated torque calculation part 52. It is seen from these graphs that convergence of the estimated Coulomb friction coefficient value coincides with convergence of the trace tr ($A_k^T A_k$). Therefore, the identification progress degree calculation part 57 can adopt the value of the trace tr $(A_k^T A_k)$ as a criterion for determining the progress degree of the identification of the friction model.

Figure 8B:
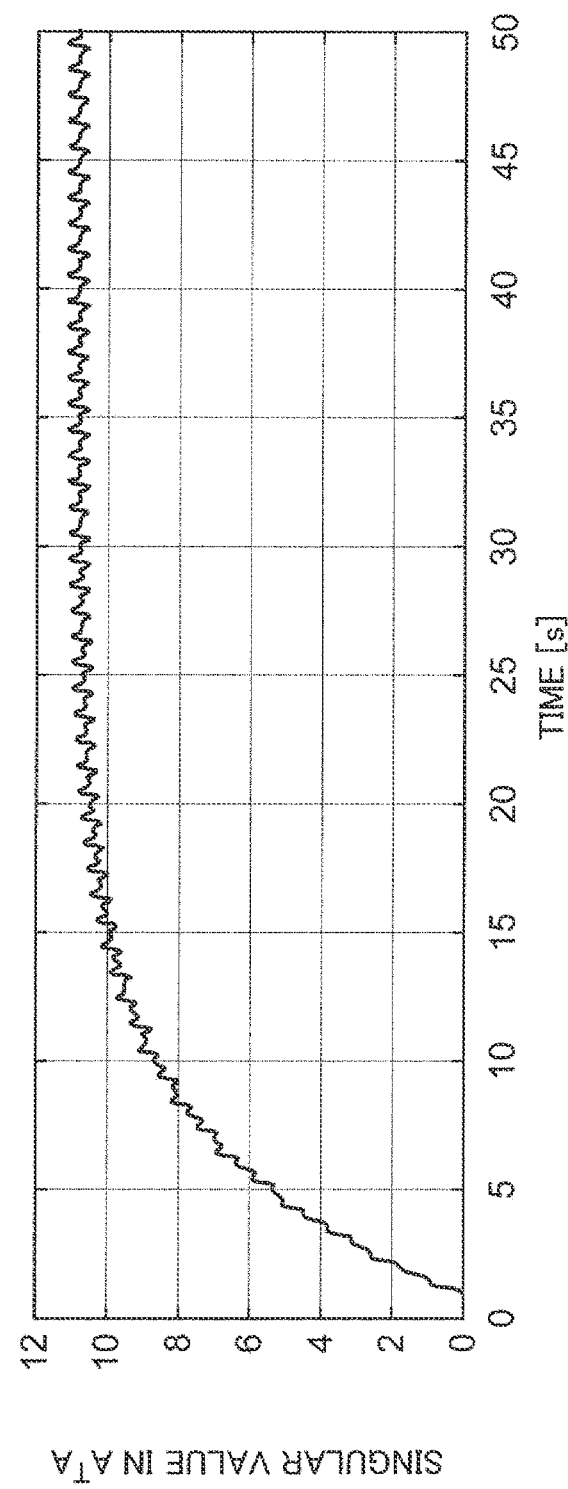
FIG. 8B is a graph showing a change in a singular value in the matrix $A_k^T A_k$.

Alternatively, the identification progress degree calculation part 57 may adopt a singular value in the matrix $A_k^T A_k$ as a criterion for determining the progress degree of the identification of the friction model. Each of FIGS. 8A and 8B is a graph showing a change in corresponding one of two singular values in the matrix $A_k^T A_k$ in a simulation of the friction estimation using the model in Formula (1). FIG. 8A shows the first singular value in the matrix $A_k^T A_k$, and FIG. 8B shows the second singular value in the matrix $A_k^T A_k$. It is seen from FIGS. 6, 8A, and 8B that convergence of the estimated Coulomb coefficient friction value coincides with convergence of the singular value in the matrix $A_k^T A_k$. Therefore, the identification progress degree calculation part 57 can adopt the singular value in the matrix $A_k^T A_k$ as a criterion for determining the progress degree of the identification of the friction model.

Figure 9:
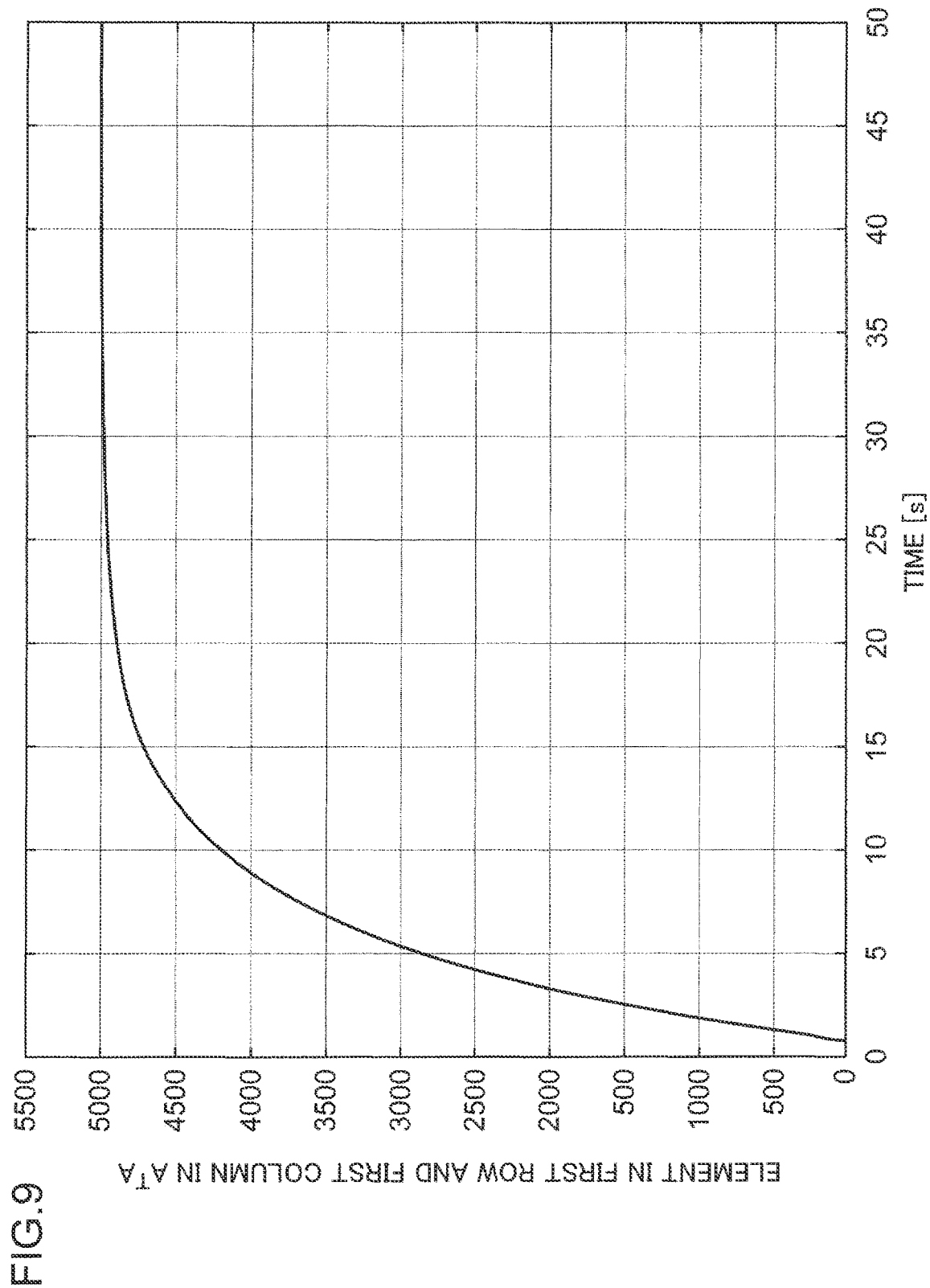
FIG. 9 is a graph showing a change in an element in a first row and a first column in the matrix $A_k^T A_k$.

Further alternatively, the identification progress degree calculation part 57 may adopt an element in a first row and a first column in the matrix $A_k^T A_k$ as a criterion for determining the progress degree of the identification of the friction model. FIG. 9 is a graph showing a change in the element in the first row and the first column in the matrix $A_k^T A_k$ in another simulation of the friction estimation using the model in Formula (1). It is seen from FIGS. 6 and 9 that convergence of the estimated Coulomb friction coefficient value coincides with convergence of the element in the first row and the first column in the matrix $A_k^T A_k$. Therefore, the identification progress degree calculation part 57 can adopt the element in the first row and the first column in the matrix $A_k^T A_k$ as a criterion for determining the progress degree of the identification of the friction model.

As another option, the identification progress degree calculation part 57 may adopt the number of conditions in the matrix $A_k$ as a criterion for determining the progress degree of the identification of the friction model. For instance, the identification of the friction model can be determined as progressing when the number of conditions in the matrix $A_k$ decreases to a somewhat small value, e.g., equal to or smaller than 100.

Here, the identification progress degree calculation part 57 is presumed to adopt only one of the value of the trace tr $(A_k^T A_k)$ in the matrix $A_k^T A_k$, the singular value in the matrix $A_k^T A_k$, the element in the first row and the first column in the matrix $A_k^T A_k$, and the number of conditions in the matrix $A_k$. However, the identification progress degree calculation part 57 may adopt a combination of at least two of them.

In the second embodiment, each of the value of the trace tr $(A_k^T A_k)$ in the matrix $A_k^T A_k$, the singular value in the matrix $A_k^T A_k$, the element in the first row and the first column in the matrix $A_k^T A_k$, and the number of conditions in the matrix $A_k$ corresponds to an exemplary criterion obtained by way of calculation using diagonal elements in the matrix $A_k^T A_k$ to be adopted for the identification of the friction model. In the second embodiment, the estimated torque calculation part 52 corresponds to an exemplary estimation part.

The threshold setting part 58 sets the collision determination threshold in the threshold storage part 54 based on the progress degree of the identification calculated by the identification progress degree calculation part 57. For instance, the threshold setting part 58 sets a threshold larger than a normal threshold when the identification is determined not to progress under tr $(A_k^T A_k) < 5000$, and sets the normal threshold when the identification is determined to be attained under tr $(A_k^T A_k) \geq 5000$ for a change in the trace tr $(A_k^T A_k)$ in the matrix $A_k^T A_k$ as shown in FIG. 7.

In the second embodiment, the threshold setting part 58 corresponds to an exemplary detection control part.

The estimated torque calculation part 52 may take a temperature change in the welding robot 10 into consideration when estimating the frictional force, even though such consideration of the temperature change in the welding robot 10 for the calculation is not mentioned heretofore. Specifically, a model of the welding robot 10 obtained by adding a temperature change model of the friction to Formula (1) is expressed by the following formula:

$$j\frac{d^2\theta}{dt^2} + (F_T(T) + \Delta F)\text{sign}\left(\frac{d\theta}{dt}\right) + (B_T(T) + \Delta B)\frac{d\theta}{dt} = \tau. \qquad (2)$$

In Formula (2), the reference sign "T" denotes a temperature, the reference sign "$F_T(T)$" denotes a Coulomb friction coefficient, and the reference sign "$B_T(T)$" denotes a viscosity friction coefficient, the Coulomb friction coefficient and the viscosity friction coefficient being obtainable owing to the temperature change model of the friction. The reference sign "$\Delta F$" denotes a difference between an actual friction coefficient and $F_T(T)$, and the reference sign "$\Delta B$" denotes a difference between the actual friction coefficient and $B_T(T)$, respectively. The temperature change model of the friction is defined to be obtainable by a test in advance. In this case, the friction model based on the temperature change in the welding robot 10 is expressed by the following formula:

$$B_k = \left[\begin{array}{c} \rho B_{k-1} \\ D_k - F_T(T_k)\text{sign}\left(\frac{d\theta_k}{dt}\right) - B_T(T_k)\frac{d\theta_k}{dt} \end{array}\right].$$

$$B_0 = D_0 - F_T(T_0)\text{sign}\left(\frac{d\theta_0}{dt}\right) - B_T(T_0)\frac{d\theta_0}{dt}$$

The estimated torque calculation part 52 can more reliably estimate the friction by identifying a friction model based on the aforementioned friction model.

Figure 10:
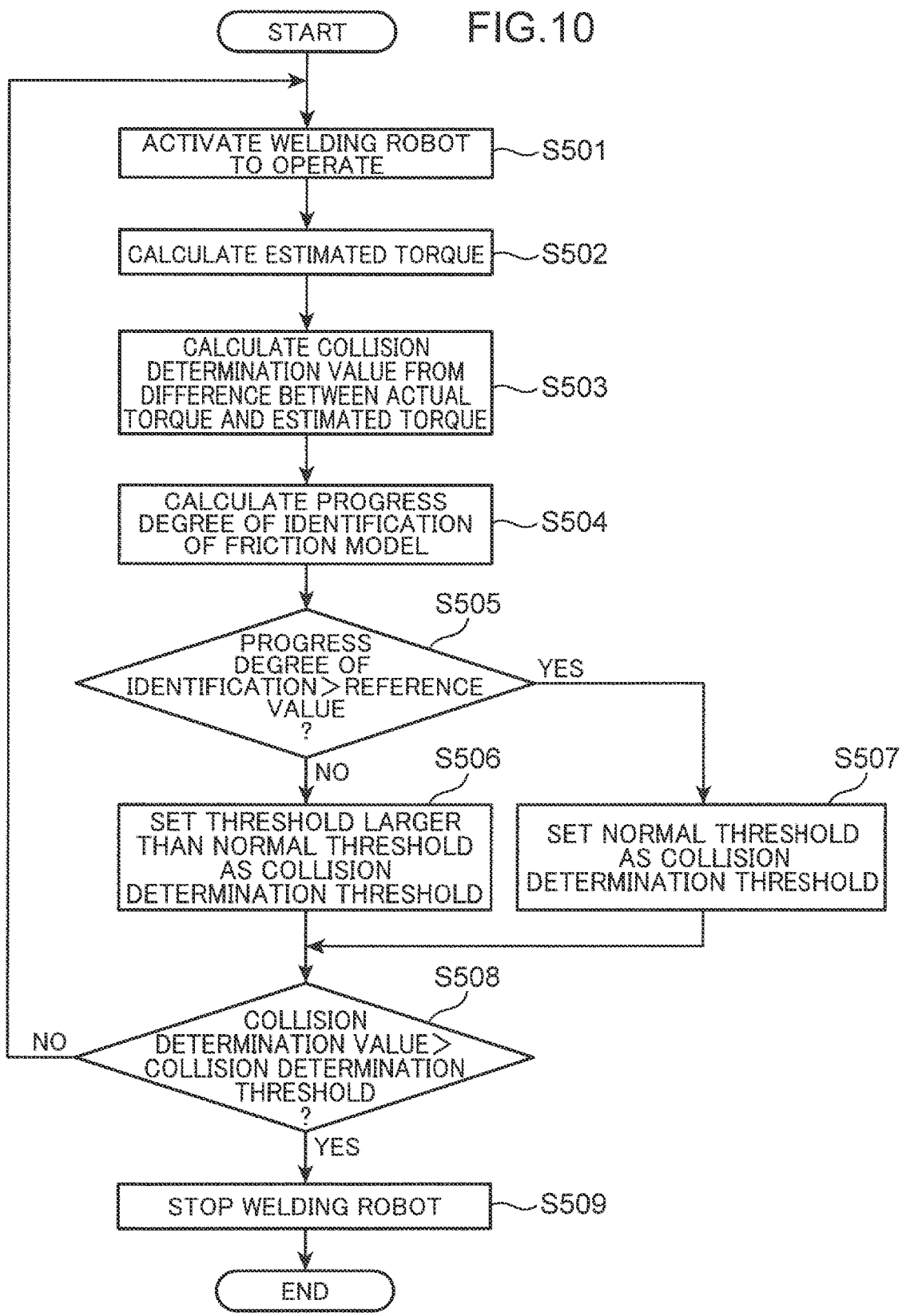
FIG. 10 is a flowchart showing an exemplary operation of the robot controller according to the second embodiment.

FIG. 10 is a flowchart showing an exemplary operation of the robot controller 30 according to the second embodiment.

As shown in FIG. 10, in the robot controller 30, the control part 51 first controls the welding robot 10 by way of a motor drive to achieve a predetermined operation after activating the welding robot 10 (step S501).

Subsequently, the estimated torque calculation part 52 estimates an inertia force, a centrifugal force, a frictional force, and other forces to occur in the welding robot 10, and calculates an estimated torque (step S502). At this time, the estimated torque calculation part 52 identifies the friction model by using the forgetting factor recursive least squares way, and calculates the estimated torque by using the frication model as described above.

Next, the determination value calculation part 53 calculates a collision determination value from a torque difference between an actual torque representing a measurement value of an actually generated torque in the welding robot 10 and the estimated torque calculated in step S502 (step S503).

Meanwhile, in the robot controller 30, the identification progress degree calculation part 57 calculates a progress degree of identification by using the friction model identified in step S502 (step S504).

Then, the threshold setting part 58 sets a collision determination threshold in the threshold storage part 54 based on the progress degree of the identification calculated in step S504. Here, the threshold setting part 58 sets the collision determination threshold for determining that the collision occurs when the collision determination value exceeds the collision determination threshold. Specifically, the threshold setting part 58 first determines whether or not the progress degree of the identification of the friction model calculated in step S504 is larger than a reference value (step S505). When the progress degree of the identification calculated in step S504 is determined not to be larger than the reference value, that is, the progress degree of the identification is determined to be equal to or smaller than the reference value (NO in step S505), the threshold setting part 58 sets the threshold larger than the normal threshold as the collision determination threshold (step S506). Conversely, when the progress degree of the identification calculated in step S504 is determined to be larger than the reference value (YES in step S505), the threshold setting part 58 sets the normal threshold as the collision determination threshold (step S507).

Thereafter, the comparison part 55 compares the collision determination value calculated in step S503 with the collision determination threshold set in step S506 or step S507, and determines whether or not the collision determination value exceeds the collision determination threshold (step S508). When the collision determination value is determined not to exceed the collision determination threshold (NO in step S508), the flow returns to step S501 so that the control part 51 continues operating the welding robot 10. Conversely, when the collision determination value is determined to exceed the collision determination threshold (YES in step S508), the control part 51 stops the welding robot 10 (step S509), and the flow finishes there.

In the exemplary operation, the robot controller 30 executes steps S504 to S507 after the execution of step S503. However, the execution sequence should not be limited thereto. The robot controller 30 may execute step S503 in parallel to steps S504 to S507, or may execute step S503 after the execution of steps S504 to S507.

Meanwhile, each of an input to the motor for the calculation of the estimated torque by the estimated torque calculation part 52 in step S502 and the actual torque for the calculation of the collision determination value by the determination value calculation part 53 in step S503 contains a noise in many cases. To avoid such a noise, a disturbance estimation observer may directly estimate a value of a disturbance torque. In this case, in FIG. 5, the disturbance estimation observer is preferably provided in place of the estimated torque calculation part 52. In FIG. 10, steps S502 and S503 may be changed so that the disturbance estimation observer estimates the value of the disturbance torque in step S502, and the value of the disturbance torque estimated in step S502 is defined as the collision determination value in step S503, respectively.

Conclusively, according to the second embodiment, the value of the trace tr $(A_k^T A_k)$ in the matrix $(A_k^T A_k)$ is adopted as a criterion for determining the progress degree of the identification of the friction model. This makes it possible to easily determine whether or not the estimated value of the friction coefficient converges, and prevent an increase in the possibility of a false detection of a collision.

Third Embodiment

A welding robot system 1 in a third embodiment results from a combination of the welding robot system 1 in the first embodiment and the welding robot system 1 in the second embodiment.

Figure 11:
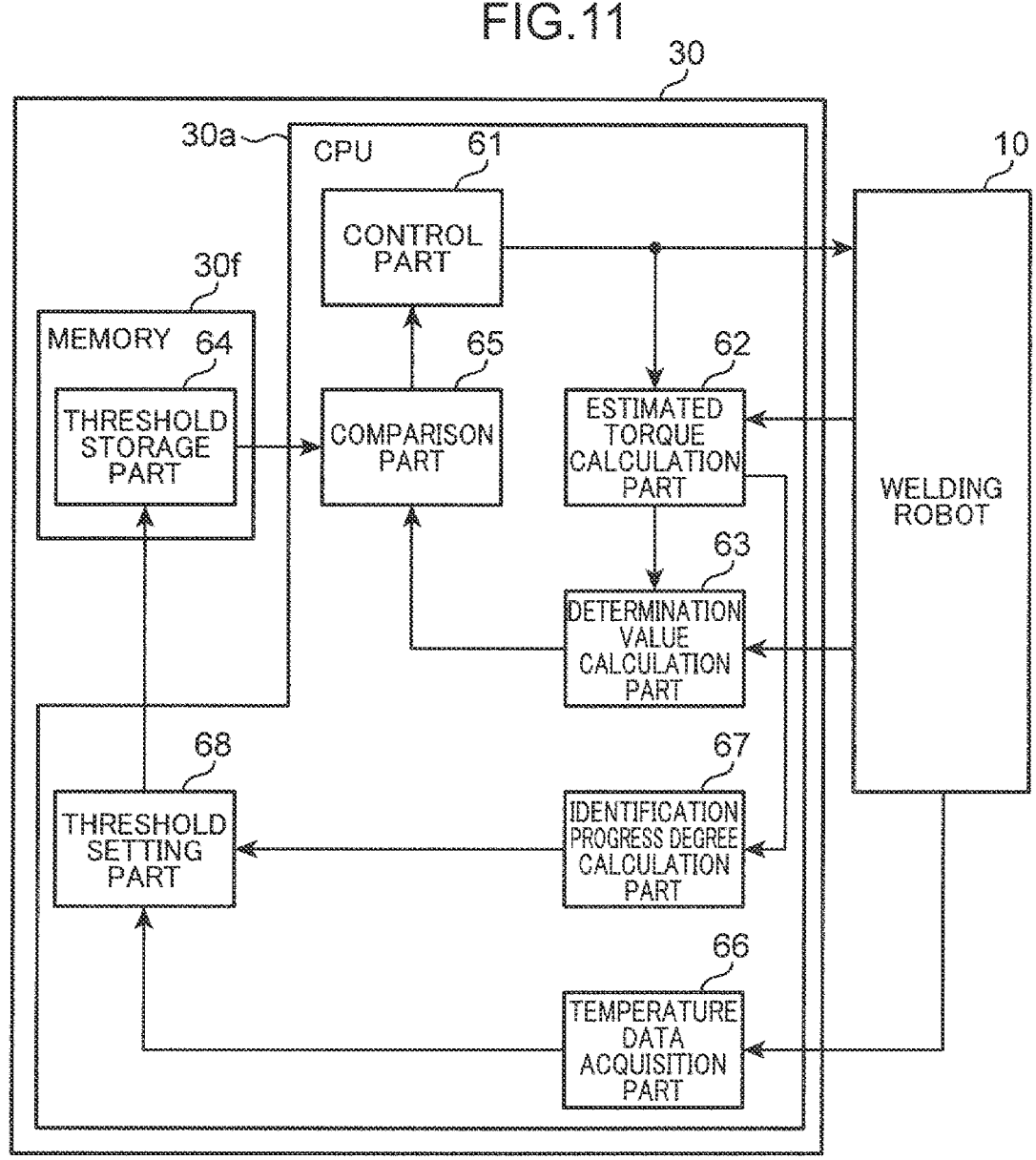
FIG. 11 is a block diagram showing an exemplary configuration of a robot controller according to a third embodiment.

FIG. 11 is a block diagram showing an exemplary configuration of a robot controller 30 according to the third embodiment. As shown in FIG. 11, a memory 30f of the robot controller 30 includes a threshold storage part 64. The threshold storage part 64 is incorporated in, for example, a RAM 30c (FIG. 1) or an EEPROM 30d (FIG. 1) of the memory 30f. A CPU 30a of the robot controller 30 serves as a control part 61, an estimated torque calculation part 62, a determination value calculation part 63, a comparison part 65, a temperature data acquisition part 66, an identification progress degree calculation part 67, and a threshold setting part 68 by reading a program stored in a ROM 30b (FIG. 1) in the third embodiment into the RAM 30c (FIG. 1) and executing the program.

The control part 61, the estimated torque calculation part 62, the determination value calculation part 63, the threshold storage part 64, the comparison part 65, and the identification progress degree calculation part 67 are respectively equivalent to the control part 51, the estimated torque calculation part 52, the determination value calculation part 53, the threshold storage part 54, the comparison part 55, and the identification progress degree calculation part 57 shown in FIG. 5 (the second embodiment). Accordingly, the detailed description for these components is omitted. Further, the temperature data acquisition part 66 is equivalent to the temperature data acquisition part 46 shown in FIG. 3 (the first embodiment). Accordingly, the detailed description for this component is omitted.

The threshold setting part 68 sets a collision determination threshold in the threshold storage part 64 based on a progress degree of identification of a friction model calculated by the identification progress degree calculation part 67 and temperature data acquired by the temperature data acquisition part 66. In the third embodiment, the threshold setting part 68 corresponds to an exemplary detection control part.

Figure 12:
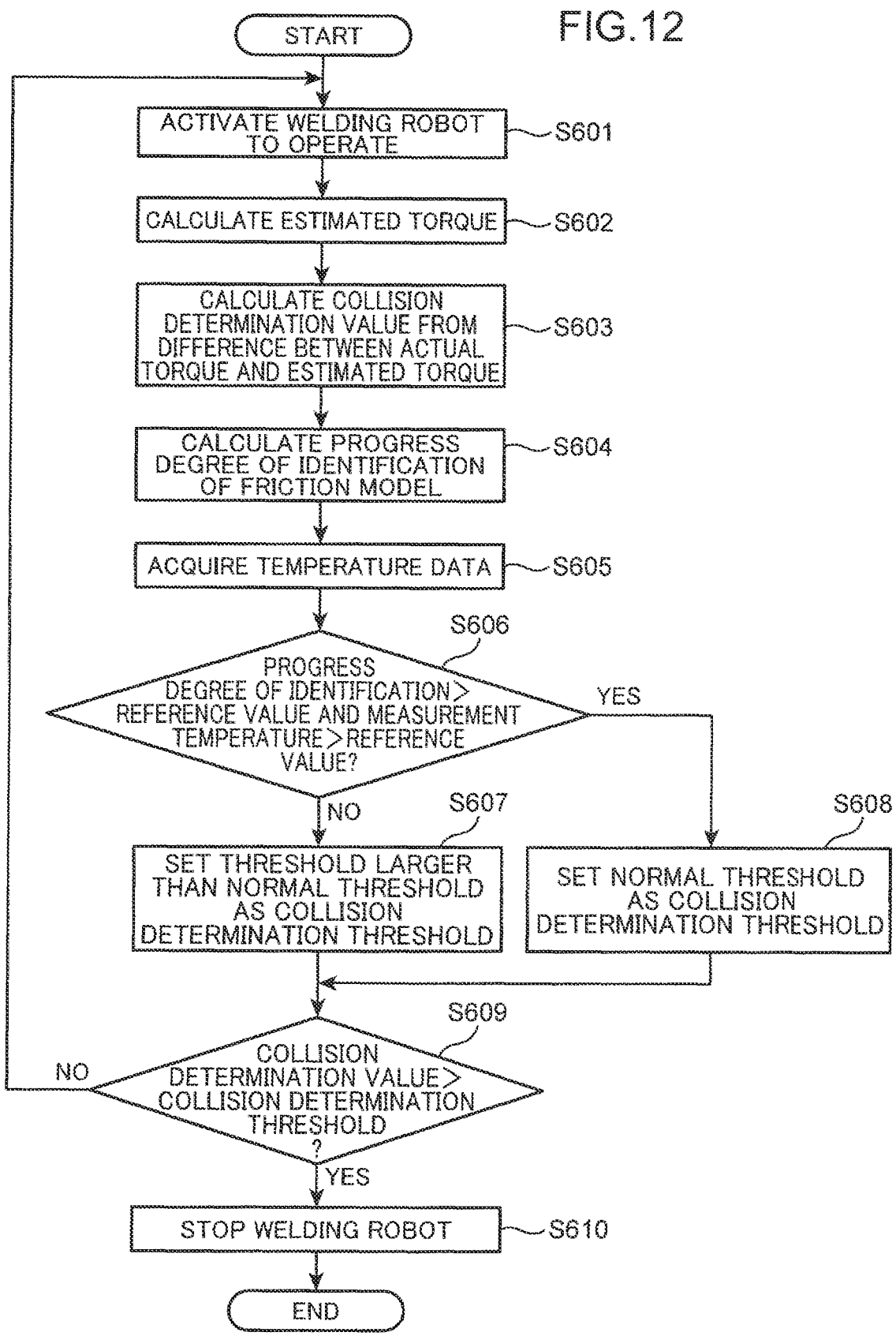
FIG. 12 is a flowchart showing an exemplary operation of the robot controller according to the third embodiment.

FIG. 12 is a flowchart showing an exemplary operation of the robot controller 30 according to the third embodiment.

Steps S601 to S603 are equivalent to steps S501 to S503 shown in FIG. 10. Accordingly, the detailed description for these steps is omitted.

Meanwhile, in the robot controller 30, the identification progress degree calculation part 67 calculates a progress degree of identification of a friction model by using the friction model identified in step S602 (step S604).

The temperature data acquisition part 66 acquires temperature data indicating a temperature of a speed reducer of the welding robot 10 that is measured by a temperature sensor (step S605).

Subsequently, the threshold setting part 68 sets a collision determination threshold in the threshold storage part 64 based on the progress degree of the identification of the friction model calculated in step S604 and the measurement temperature indicated in the temperature data acquired in step S605. Here, the threshold setting part 68 sets the collision determination threshold for determining that a collision occurs when a collision determination value exceeds the collision determination threshold. Specifically, the threshold setting part 68 first determines whether or not the progress degree of the identification of the friction model calculated in step S604 is larger than a reference value and the measurement temperature of the speed reducer indicated in the temperature data acquired in step S605 is higher than a reference temperature (step S606).

When the progress degree of the identification of the friction model calculated in step S604 is determined not to be larger than the reference value and the measurement temperature indicated in the temperature data acquired in step S605 is determined not to be higher than the reference temperature, that is, the progress degree of the identification of the friction model calculated in step S604 is determined to be equal to or smaller than the reference value, or the measurement temperature indicated in the temperature data acquired in step S605 is determined to be equal to or lower than the reference temperature (NO in step S606), the threshold setting part 68 sets a threshold larger than a normal threshold as the collision determination threshold (step S607). Conversely, when the progress degree of the identification of the friction model calculated in step S604 is determined to be larger than the reference value and the measurement temperature indicated in the temperature data acquired in step S605 is determined to be higher than the reference temperature (YES in step S606), the threshold setting part 68 sets the normal threshold as the collision determination threshold (step S608).

The subsequent steps S609 to S610 are respectively equivalent to steps S508 to S509 shown in FIG. 10. Accordingly, the detailed description for these steps is omitted.

In the exemplary operation, the robot controller 30 executes steps S604 to S608 after the execution of step S603. However, the execution sequence should not be limited thereto. The robot controller 30 may execute step S603 in parallel to step S604 to 608, or may execute step S603 after the execution of steps S604 to S608. Alternatively, the robot controller 30 may execute only step S605 among steps S604 to S608 before or in parallel to the execution of step S602.

Meanwhile, each of an input to the motor for the calculation of the estimated torque by the estimated torque calculation part 62 in step S602 and the actual torque for the calculation of the collision determination value by the determination value calculation part 63 in step S603 contains a noise in many cases. To avoid such a noise, a disturbance estimation observer may directly estimate a value of a disturbance torque. In this case, in FIG. 11, the disturbance estimation observer is preferably provided in place of the estimated torque calculation part 62. In FIG. 12, steps S602 and S603 may be changed so that the disturbance estimation observer estimates the value of the disturbance torque in step S602, and the value of the disturbance torque estimated in step S602 is defined as the collision determination value in step S603, respectively.

Conclusively, according to the third embodiment, the collision determination threshold is increased when the measurement temperature of the robot 10 is equal to or lower than the reference temperature under the situation where, for example, the threshold is required to be changed due to a large friction caused by a low temperature of the robot 10. This consequently makes it possible to prevent an increase in the possibility of a false detection of a collision. Additionally, the value of the trace tr $(A_k^T A_k)$ in the matrix $(A_k^T A_k)$ is, for example, adopted as a criterion for determining the progress degree of the identification of the friction model. This makes it possible to easily determine whether or not the estimated value of the friction coefficient converges, and prevent an increase in the possibility of a false detection of a collision.

Fourth Embodiment

A welding robot system 1 in a fourth embodiment also can perform collision detection of detecting a collision of a welding robot 10 with an object and stopping the welding robot 10 upon the collision in the same manner as the welding robot system 1 in each of the first to the third embodiments. However, in the fourth embodiment, a collision determination value in the collision detection is changed when an operational state of the welding robot 10 satisfies a predetermined condition in a winter term.

Figure 13:
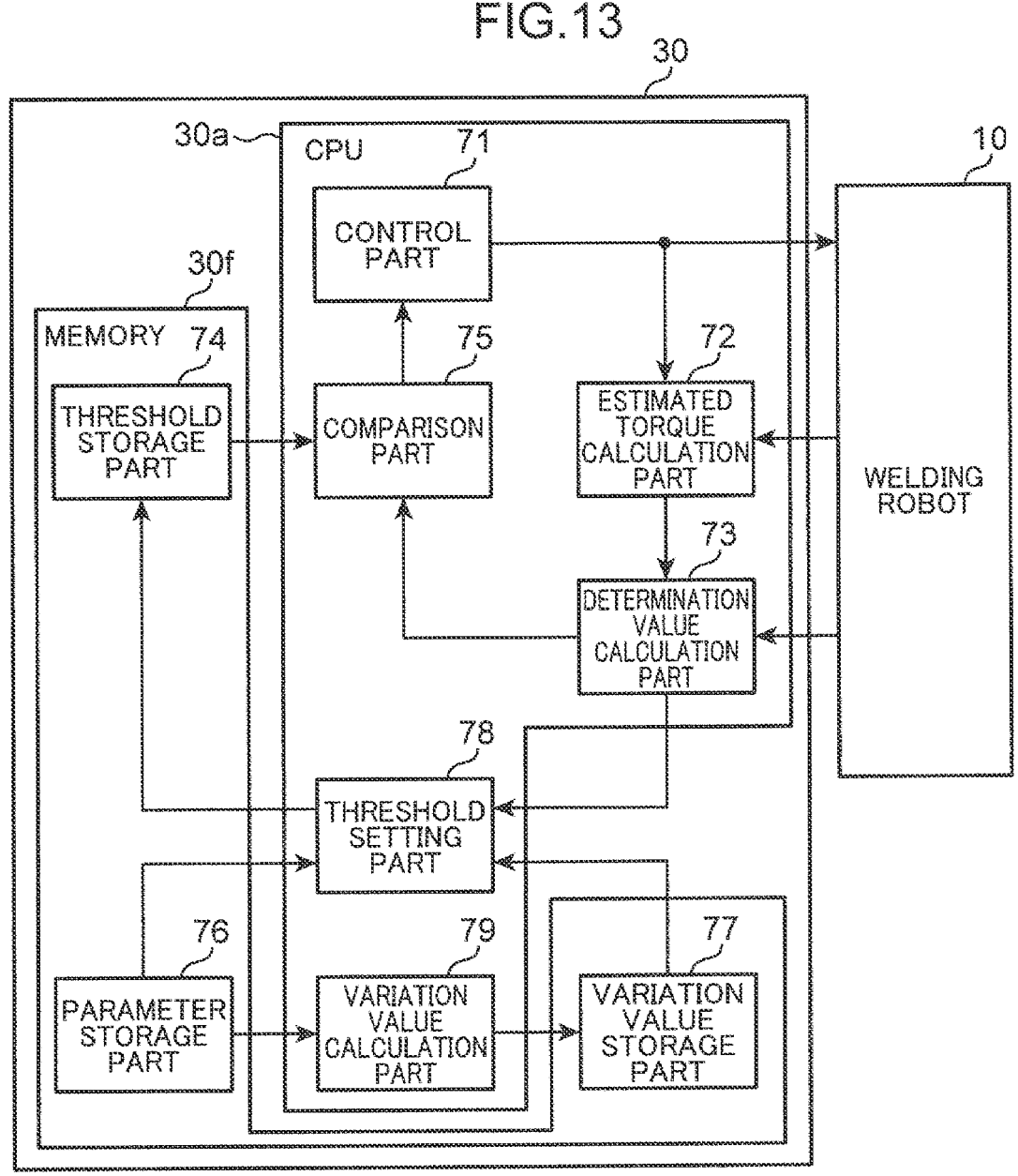
FIG. 13 is a block diagram showing an exemplary configuration of a robot controller according to a fourth embodiment.

FIG. 13 is a block diagram showing an exemplary configuration of a robot controller 30 according to the fourth embodiment. As shown in FIG. 13, a memory 30f of the robot controller 30 includes a threshold storage part 74, a parameter storage part 76, and a variation value storage part 77. The threshold storage part 74, the parameter storage part 76, and the variation value storage part 77 are incorporated in, for example, a RAM 30c (FIG. 1) or an EEPROM 30d (FIG. 1) of the memory 30f. A CPU 30a of the robot controller 30 serves as a control part 71, an estimated torque calculation part 72, a determination value calculation part 73, a comparison part 75, a threshold setting part 78, and a variation value calculation part 79 by reading a program stored in a ROM 30b (FIG. 1) in the fourth embodiment into the RAM 30c (FIG. 1) and executing the program.

The control part 71, the estimated torque calculation part 72, the determination value calculation part 73, the threshold storage part 74, and the comparison part 75 are respectively equivalent to the control part 41, the estimated torque calculation part 42, the determination value calculation part 43, the threshold storage part 44, and the comparison part 45 shown in FIG. 3 (the first embodiment). Accordingly, the detailed description for these components is omitted.

The parameter storage part 76 stores various parameters which the threshold setting part 78 refers to when setting a collision determination threshold in the threshold storage part 74. The various parameters include the following parameters.

Specifically, a first parameter is a start time of the winter term. The start time may be a start month (e.g., November). A second parameter is a finish time of the winter term. The finish time may be a finish month (e.g., March).

A third parameter is a threshold of a time (hereinafter, referred to as a "stop time threshold") during which the welding robot 10 (or a servomotor thereof) is stopped, the stop time threshold being a premise for setting a threshold larger than a normal threshold as the collision determination threshold in the winter term. Hereinafter, the stop time threshold is defined as t0. The stop time threshold t0 may employ, for example, 1 hour.

A fourth parameter is a total running time (a total servo-running-ON time) during which the welding robot 10 keeps the servomotor on, the total running time being required for an operation (hereinafter, referred to as a "winter operation") under the threshold larger than the normal threshold that is set as the collision determination threshold in the winter term. Hereinafter, the total running time is defined as t1. The time t1 may employ, for example, 30 minutes.

A fifth parameter is a total running time (a total servo-running-ON time) during which the welding robot 10 keeps the servomotor on, the total running time being required to start monitoring of a collision determination value in the winter term. Hereinafter, the total running time is defined as t2. The time t2 may employ, for example, 24 minutes. Alternatively, a proportion to the total servo-running-ON time of the welding robot 10 required for the winter operation at a specific time point may be defined as the fifth parameter in place of the time t2.

A sixth parameter is a difference value obtained by subtracting the normal threshold from the threshold larger than the normal threshold that is set as the collision determination threshold in the winter term. Hereinafter, the difference value is defined as ΔTh. The difference value ΔTh may be, for example, 60% of the normal threshold. In other words, the proportion of the threshold larger than the normal threshold to the normal threshold may be 160%.

The variation value storage part 77 records various variation values each varies in accordance with an operation of the welding robot system 1. The variation values include the following variation values.

Specifically, a first variation value represents the total servo-running-ON time of the welding robot 10 that is required for the winter operation at the specific time point. Hereinafter, the total servo-running-ON time is defined as T1. In an initial stage, the time t1 that is the fourth parameter stored in the parameter storage part 76 is set as the time T1 corresponding to the first variation value.

A second variation value represents the total servo-running-ON time of the welding robot 10 that is required to start monitoring of the collision determination value at the specific time point. Hereinafter, the total servo-running-ON time is defined as T2. In the initial stage, the time t2 that is the fifth parameter stored in the parameter storage part 76 is set as the time T2 corresponding to the second variation value. However, in the case where the proportion to the total servo-running-ON time of the welding robot 10 required for the winter operation at the specific time point is stored as the fifth parameter in place of the time t2 in the parameter storage part 76, the variation value storage part 77 may not store the second variation value.

A third variation value represents a collision determination value at maximum (hereinafter, referred to as a "maximal determination value") in a time section during which the monitoring of the collision determination value at the specific time point is performed. In the initial stage, a minimum value (e.g., "0") of the collision determination value is set as the maximal determination value corresponding to the third variation value.

The threshold setting part 78 can perform time measurement of measuring a time. The threshold setting part 78 sets the collision determination threshold in the threshold storage part 74 based on the various parameters stored in the parameter storage part 76 and the various variation values stored in the variation value storage part 77.

Specifically, the threshold setting part 78 sets the threshold larger than the normal threshold in the threshold storage part 74 in place of the normal threshold when a condition concerning an operational state of the welding robot 10 is satisfied under a circumstance where a current date falls between the start time of the winter term that is the first parameter stored in the parameter storage part 76 and the finish time of the winter term that is the second parameter stored therein. Here, the condition concerning the operational state of the welding robot 10 includes a condition that the total servo-running-ON time from an operation start of the servomotor does not reach the time T1 corresponding to the first variation value stored in the variation value storage part 77 after a power source of the welding robot system 1 is turned on or after the servomotor of the robot 10 is kept off in a time of the stop time threshold t0 or longer, the threshold t0 being the third parameter stored in the parameter storage part 76. Furthermore, the threshold larger than the normal threshold is obtained by adding the value ΔTh that is the sixth parameter stored in the parameter storage part 76 to the normal threshold.

In the fourth embodiment, the winter term from the start time that is the first parameter stored in the parameter storage part 76 to the finish time that is the second parameter stored in the parameter storage part 76 is an exemplary predetermined term during which the temperature of the robot is estimated to be lower than a predetermined temperature. In the fourth embodiment, the circumstance where the current date falls between the start time of the winter term that is the first parameter stored in the parameter storage part 76 and the finish time of the winter term that is the second parameter is an exemplary predetermined circumstance where the temperature of the robot is lower than the predetermined temperature. In the fourth embodiment, the threshold setting part 78 is an exemplary control part.

The variation value calculation part 79 counts the total servo-running-ON time from the operation start of the servomotor after the power source of the welding robot 10 is turned on or after the welding robot 10 is stopped in the time of the stop time threshold t0 or longer, the threshold t0 being the third parameter stored in the parameter storage part 76. When the collision determination value calculated by the determination value calculation part 73 at the specific time keeps maximum until the counted total servo-running-ON time reaches the time T1 corresponding to the first variation value stored in the variation value storage part 77 after passing the time T2 corresponding to the second variation value stored in the variation value storage part 77, the variation value calculation part 79 stores the calculated determination value in the variation value storage part 77 as the maximal determination value.

The variation value calculation part 79 adds the time t1 that is the fourth parameter stored in the parameter storage part 76 to the time T1 corresponding to the first variation value stored in the parameter storage part 76 at a timing when the total servo-running-ON time from the operation start of the servo motor reaches the time T1 corresponding to the first variation value stored in the variation value storage part 77 after the power source of the welding robot 10 is turned on or after the welding robot 10 is stopped in the time of the stop time threshold t0 or longer, the threshold t0 being the third parameter stored in the parameter storage part 76. At this timing, the maximal determination value stored in the variation value storage part 77 is larger than the normal threshold and smaller than a threshold (corresponding to an exemplary increased value) obtained by adding the value ΔTh that is the sixth parameter stored in the parameter storage part 76 to the normal threshold (corresponding to an exemplary initial value). In this way, the time required for the winter operation is extended.

Similarly, in the case where the parameter storage part 76 stores the time t2 as the fifth parameter, the time t2 that is the fifth parameter stored in the parameter storage part 76 is added to the time T2 corresponding to the second variation value stored in the variation value storage part 77. As a result, a time to start the monitoring of the collision determination value in the winter term is reset.

Although the variation value calculation part 79 here extends the time required for the winter operation when the maximal determination value stored in the variation value storage part 77 is larger than the normal threshold and smaller than the threshold obtained by adding the value ΔTh to the normal threshold, the way of extension should not be limited thereto. The variation value calculation part 79 may extend the time required for the winter operation when another condition that the collision determination value calculated by the determination value calculation part 73 approaches the threshold obtained by adding the value ΔT to the normal threshold is satisfied.

In the fourth embodiment, the variation value calculation part 79 is an exemplary extension control part.

Here, the variation value calculation part 79 immediately reflects a change in each of the first parameter to the sixth parameter in the parameter storage part 76. However, when each of the first parameter to the fifth parameter is changed during counting of the time t0 that is the third parameter or the time t1 that is the fourth parameter, the change is reflected after the finish of the counting.

Figure 14:
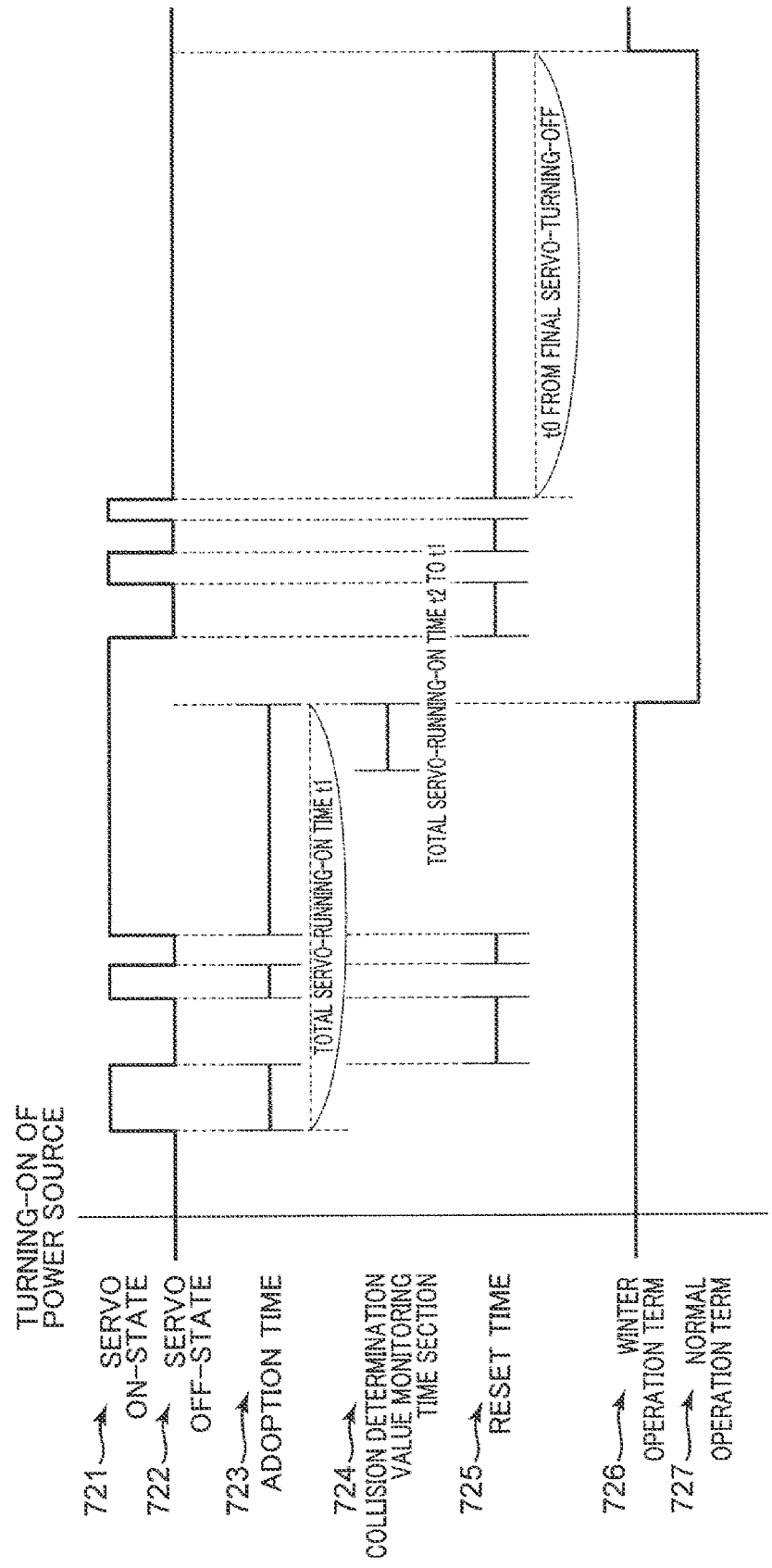
FIG. 14 is a time sequence diagram in the fourth embodiment.

FIG. 14 is a time sequence diagram in the fourth embodiment. The time sequence diagram shows a transition between a servo-ON state 721 indicating a state where the servomotor is on and a servo-OFF state 722 indicating a state where the servomotor is off. An adoption time 723 represents a time during which the winter operation is adopted. Specifically, the adoption time 723 represents a time from a time point when the servomotor is turned on to a finish time point for the winter operation when the total servo-running-ON time reaches the time t1. A collision determination value monitoring time section 724 represents a time section for determining whether or not the collision determination value is maximum. Specifically, the collision determination value monitoring time section 724 represents a time section from a time point when the total servo-running-ON time reaches the time t2 to a time point 3 when the total-servo-running-ON time reaches the time t1.

A reset time 725 represents a time during which the servomotor is kept off. The counting of the total servo-running-ON time is stopped during the reset time 725. The stop time of the servomotor is counted upon the start of the reset time 725. After the finish of the reset time 725, a counted value of the stop time of the servomotor is reset. A winter operation term 726 represents a term in which the threshold larger than the normal threshold is set in the threshold storage part 74, and a normal operation term 727 represents a term in which the normal threshold is set in the threshold storage part 74. It should be noted that the time sequence diagram excludes the extension of the time required for the winter operation.

As shown in FIG. 14, the winter operation is adopted until the total servo-running-ON time from the operation start of the servomotor reaches the time t1 after the power supply is turned on. At the same time, it is also determined whether or not the collision determination value is maximum in the time section from the time t2 to the time t1 of the total servo-running-ON time from the operation start of the servomotor.

As shown around the right end in FIG. 14, the winter operation is adopted even after the lapse of the time of the stop time threshold t0 from the turning-off of the servomotor in the same manner as the state after the turning-on of the power source. Although a subsequent state of the time sequence is unillustrated in the drawing, the winter operation is adopted until the total servo-running-ON time from the operation start of the servomotor reaches the time t1.

Figure 15:
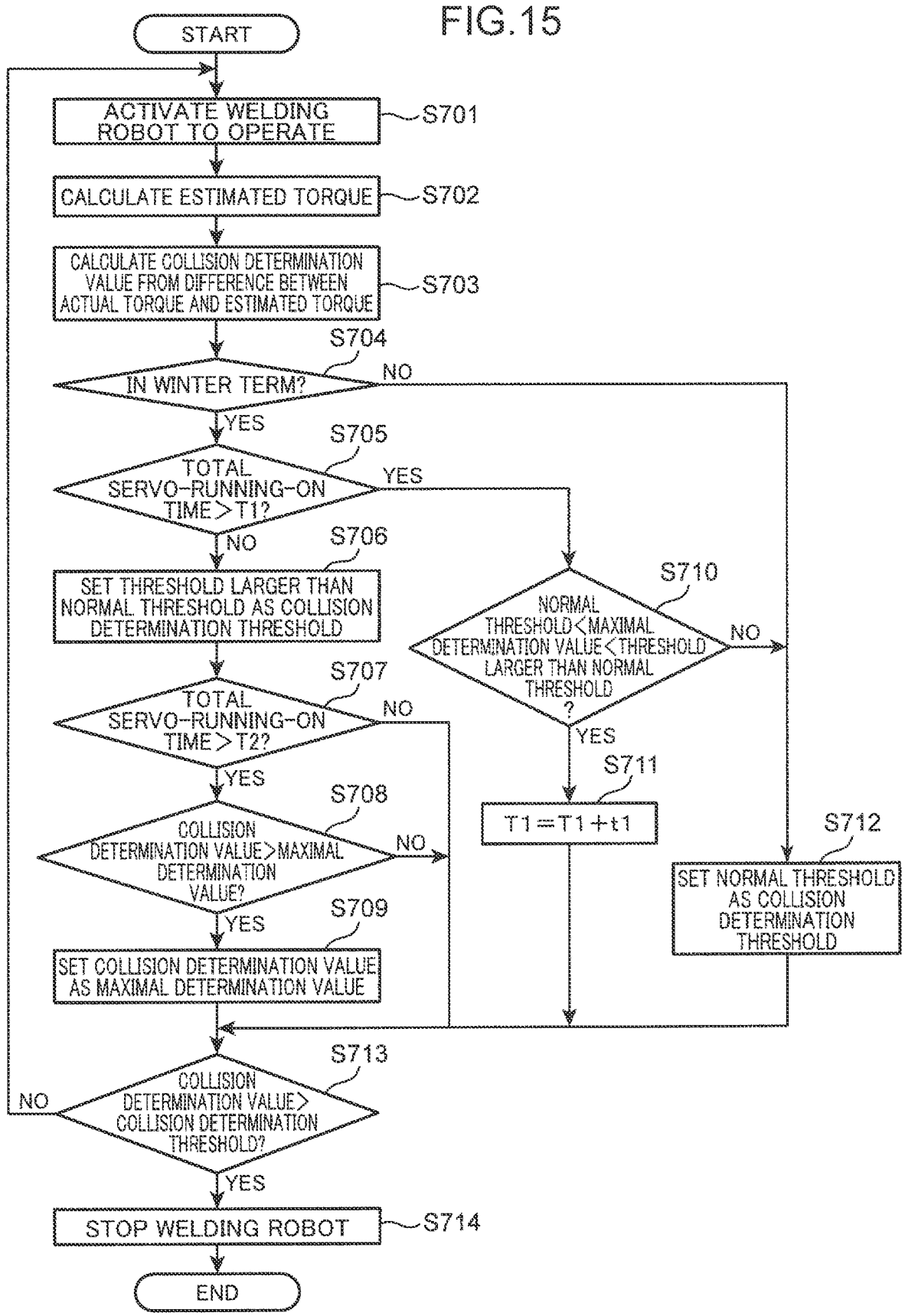
FIG. 15 is a flowchart showing an exemplary operation of the robot controller according to the fourth embodiment.

FIG. 15 is a flowchart showing an exemplary operation of the robot controller 30 according to the fourth embodiment.

As shown in FIG. 15, in the robot controller 30, the control part 71 first controls the welding robot 10 by way of a motor drive to achieve a predetermined operation after activating the welding robot 10 (step S701).

Subsequently, the estimated torque calculation part 72 estimates an inertia force, a centrifugal force, a frictional force, and other forces to occur in the welding robot 10, and calculates an estimated torque (step S702).

Next, the determination value calculation part 73 calculates a collision determination value from a torque difference between an actual torque representing a measurement value of an actually generated torque in the welding robot 10 and the estimated torque calculated in step S702 (step S703).

Meanwhile, in the robot controller 30, the threshold setting part 78 sets a collision determination threshold in the threshold storage part 74 based on the various parameters stored in the parameter storage part 76 and the various variation values stored in the variation value storage part 77. Here, the threshold setting part 78 sets the collision determination threshold for determining that a collision occurs when the collision determination value exceeds the collision determination threshold.

Specifically, the threshold setting part 78 determines whether or not a current time is in the winter term (step S704). Specifically, the threshold setting part 78 determines whether or not the current time measured by the time measurement falls between the start time and the finish time of the winter term that are stored in the parameter storage part 76.

First, a case where the threshold setting part 78 determines that the current time is in the winter term (YES in step S704) will be described. In this case, the threshold setting part 78 determines whether or not the total servo-running-ON time from the operation start reaches the time T1 stored in the variation value storage part 77 after the power source is turned on or after the welding robot 10 is stopped in the time t0 stored in the parameter storage part 76 or longer (step S705).

When the variation value calculation part 79 determines that the total servo-running-ON time from the operation start of the servomotor does not reach the time T1 (NO in step S705), the threshold setting part 78 sets the threshold larger than the normal threshold that is obtained by adding the value ΔTh stored in the parameter storage part 76 to the normal threshold as the collision determination threshold in the threshold storage part 74 (step S706). Thereafter, the threshold setting part 78 determines whether or not the total servo-running-ON time from the operation start reaches the time T2 stored in the variation value storage part 77 (step S707). When the total servo-running-ON time from the operation start is determined to reach the time T2 (YES in step S707), the variation value calculation part 79 determines whether or not the collision determination value calculated in step S703 is larger than the maximal determination value stored in the variation value storage part 77 (step S708).

When the variation value calculation part 79 determines that the collision determination value calculated in step S703 is larger than the maximal determination value stored in the variation value storage part 77 (YES in step S708), the variation value calculation part 79 updates the maximal determination value to the collision determination value calculated in step S703 to be stored, as an updated maximal determination value, in the variation value storage part 77 (step S709), and allows the flow to advance to step S713. Conversely, when the variation value calculation part 79 determines that the collision determination value calculated in step S703 is not larger than the maximal determination value stored in the variation value storage part 77 (NO in step S708), the variation value calculation part 79 allows the flow to advance to step S713 without storing the collision determination value calculated in step S703 in the variation value storage part 77. Additionally, when the threshold setting part 78 determines that the total servo-running-ON time from the operation start does not reach the time T2 (NO in step S707), the threshold setting part 78 allows the flow to advance to step S713.

In contrast, when the variation value calculation part 79 determines that the total servo-running-ON time from the operation start of the servomotor reaches the time T1 (YES in step S705), the variation value calculation part 79 determines whether or not the maximal determination value stored in the variation value storage part 77 is larger than the normal threshold and smaller than the threshold obtained by adding the value ΔTh stored in the parameter storage part 76 to the normal threshold (step S710).

When the variation value calculation part 79 determines that the maximal determination value stored in the variation value storage part 77 is larger than the normal threshold and smaller than the threshold obtained by adding the value ΔTh stored in the parameter storage part 76 to the normal threshold (YES in step S710), the variation value calculation part 79 adds the time t1 stored in the parameter storage part 76 to the time T1 stored in the variation value storage part 77 (step S711), and allows the flow to advance to step S713.

Conversely, when the variation value calculation part 79 determines that the maximal determination value stored in the variation value storage part 77 is not larger than the normal threshold and not smaller than the threshold obtained by adding the value ΔTh stored in the parameter storage part 76 to the normal threshold (NO in step S710), the variation value calculation part 79 does not change the time T1 stored in the variation value storage part 77. Further, the threshold setting part 78 returns the threshold larger than the normal threshold that is stored as the collision determination threshold in the threshold storage part 74 to the normal threshold (step S712), and allows the flow to advance to step S713.

Next, another case where the threshold setting part 78 determines that the current time is not in the winter term (NO in step S704) will be described. In this case, the threshold setting part 78 stores the normal threshold as the collision determination threshold in the threshold storage part 74 (step S712), and allows the flow to advance to step S713.

Thereafter, the comparison part 75 compares the collision determination value calculated in step S703 with the collision determination threshold set in step S706 or step S712, and determines whether or not the collision determination value exceeds the collision determination threshold (step S713). When the collision determination value is determined not to exceed the collision determination threshold (NO in step S713), the flow returns to step S701 so that the control part 71 continues operating the welding robot 10. Conversely, when the collision determination value is determined to exceed the collision determination threshold (YES in step S713), the control part 71 stops the welding robot 10 (step S714), and the flow finishes there.

Meanwhile, each of an input to the motor for the calculation of the estimated torque by the estimated torque calculation part 72 in step S702 and the actual torque for the calculation of the collision determination value by the determination value calculation part 73 in step S703 contains a noise in many cases. To avoid such a noise, a disturbance estimation observer may directly estimate a disturbance torque. The disturbance estimation observer has a well-known configuration, and estimates a disturbance torque that is a combination of a load torque based on the centrifugal force, the frictional force and other forces, and a variation torque based on a variation in an inertia moment and a torque ripple of the motor. In this case, in FIG. 13, the disturbance estimation observer is preferably provided in place of the estimated torque calculation part 72. In FIG. 15, steps S702 and S703 may be changed so that the disturbance estimation observer estimates the disturbance torque in step S702, and the disturbance torque estimated in step S702 is defined as the collision determination value in step S703, respectively.

Figure 16A:
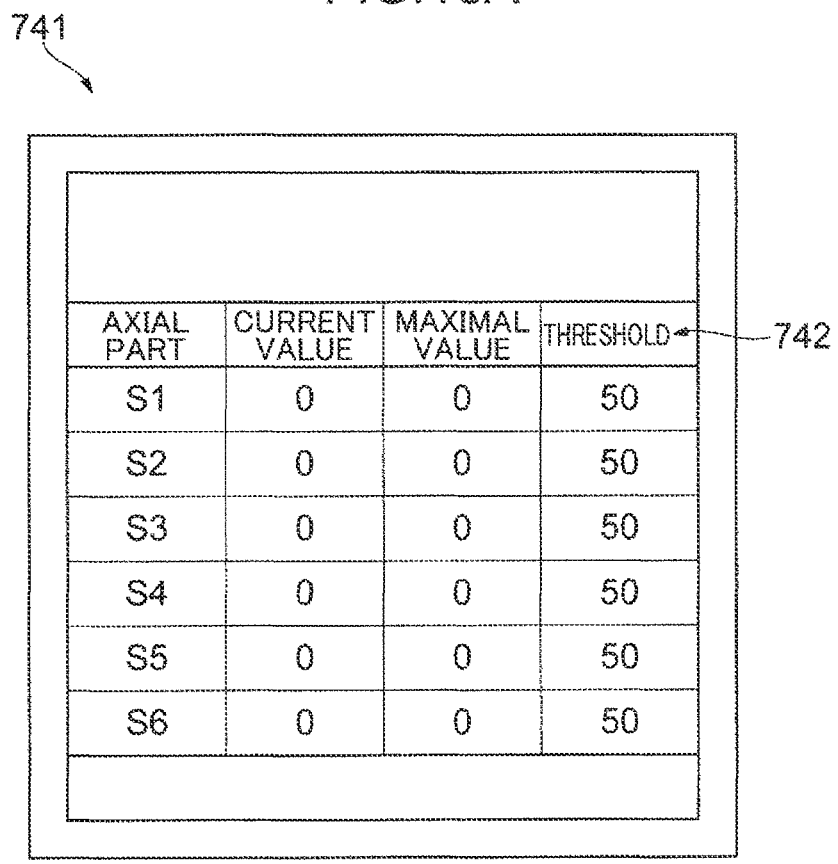
FIG. 16A shows an exemplary screen image displaying a state of a collision determination threshold.
Figure 16B:
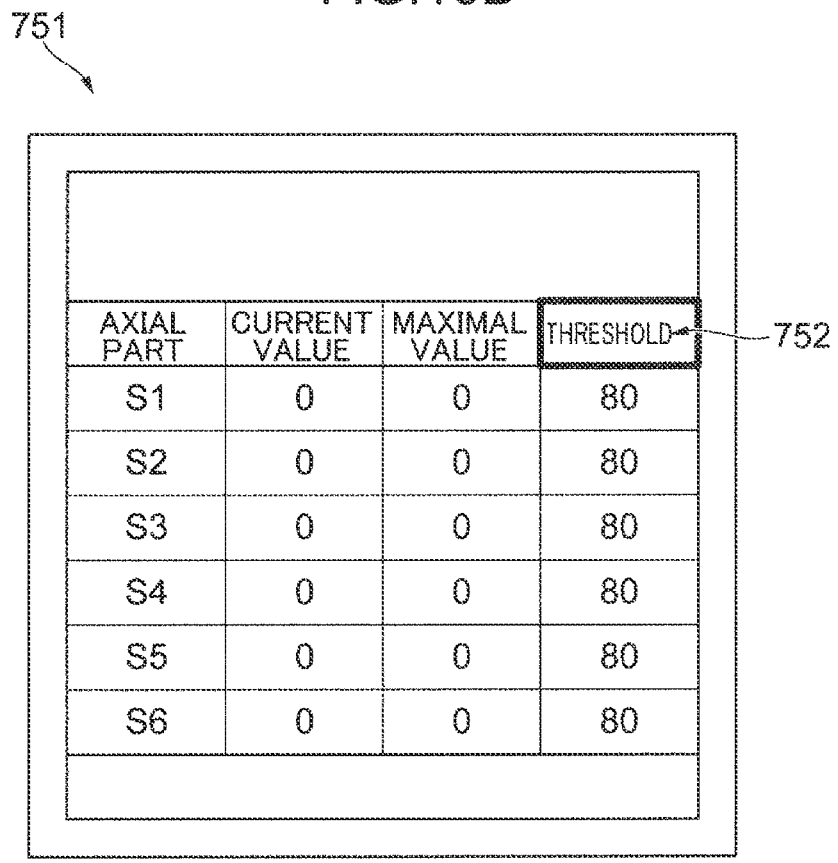
FIG. 16B shows another exemplary screen image displaying a state of a collision determination threshold.

Each of FIGS. 16A and 16B shows an exemplary screen image displaying a state of the collision determination threshold stored in the threshold storage part 74.

FIG. 16A shows a screen image 741 for a normal operation. As shown in FIG. 16A, the screen image 741 has a threshold column 742 in which the normal threshold "50" is set as the collision determination threshold for the normal operation with respect to each of the axial parts.

FIG. 16B shows a screen image 751 for the winter operation. As shown in FIG. 16B, the screen image 751 has a threshold column 752 in which the threshold "80" larger than the normal threshold "50" by 60% is set as the collision determination threshold for the winter operation with respect to each of the axial parts. The threshold column 752 may be displayed in a manner different from the manner of displaying the threshold column 742 in FIG. 16A to clarify the above-described setting of the collision determination value for the winter operation. In the illustrated example in FIG. 16B, a cell of the threshold column 752 is displayed with a thick frame therearound.

In each of the screen image 741 in FIG. 16A and the screen image 751 in FIG. 16B, the column "CURRENT VALUE" shows an instantaneous value of the current collision determination value. The column "MAXIMAL VALUE" shows a current maximal collision determination value so far. Moreover, the maximal value, when being sufficiently small in relation to the collision determination threshold, leads to a smooth operation. Additionally, for determination of the threshold, a value which is sufficiently large to cover the maximal value obtained through the above-described operational sequence may be determined as the threshold. That is to say, the maximal value can be referred to for the determination of the threshold.

Conclusively, according to the fourth embodiment, the collision determination threshold is increased under the determination that the temperature of the robot 10 is low when the current time is in the winter term and the total servo-running-ON time does not reach the time t1. This consequently makes it possible to prevent an increase in the possibility of a false detection of a collision.

The present description discloses the technologies of the various aspects as described above. Main technologies among them will be summarized below.

A first aspect of the present disclosure relates to a robot control device including: a detection part which detects a collision of a robot with an object at a predetermined collision detection sensitivity; a robot control part which performs control of operating the robot, and stopping the robot when the detection part detects the collision; and a detection control part which decreases, when a predetermined circumstance causing the robot to have a low temperature is satisfied, the collision detection sensitivity compared to when the predetermined circumstance is unsatisfied.

A second aspect of the present disclosure relates to a robot control method including: a detection step of detecting a collision of a robot with an object at a predetermined collision detection sensitivity; a robot control step of performing control of operating the robot, and stopping the robot when the collision is detected in the detection step; and a detection control step of decreasing, when a predetermined circumstance causing the robot to have a low temperature is satisfied, the collision detection sensitivity compared to when the predetermined circumstance is unsatisfied.

A third aspect of the present disclosure relates to a robot control program for causing a computer of a robot to allow: detection of detecting a collision of the robot with an object at a predetermined collision detection sensitivity; robot control of performing control of operating the robot, and stopping the robot when the collision is detected by the detection; and detection control of decreasing, when a predetermined circumstance causing the robot to have a low temperature is satisfied, the collision detection sensitivity compared to when the predetermined circumstance is unsatisfied.

In the first, the second, or the third aspect, the collision detection sensitivity is decreased when the predetermined circumstance causing the robot to have a low temperature is satisfied compared to when the predetermined circumstance is unsatisfied. When the temperature of the robot is low, a frictional force in a drive part of the robot increases. Accordingly, the possibility of a false detection of a collision increases unless the collision detection sensitivity is changed.

In this regard, according to the first, the second, or the third aspect, the collision detection sensitivity is decreased when the temperature of the robot is low. This consequently makes it possible to prevent the increase in the possibility of a false detection of a collision.

In the first aspect, the predetermined circumstance may include, for example, a circumstance causing the robot to have a low measurement temperature that is an actually measured temperature of the robot.

According to this aspect, the predetermined circumstance including the circumstance causing the robot to have the actually measured temperature can more firmly prove that the temperature of the robot is low.

In the first aspect, for example, the detection control part may decrease, when the measurement temperature is lower than a predetermined temperature, the collision detection sensitivity compared to when the measurement temperature is equal to or higher than the predetermined temperature.

In this aspect, the collision detection sensitivity is decreased when the measurement temperature is lower than the predetermined temperature compared to when the measurement temperature is equal to or higher than the predetermined temperature. When the temperature of the robot is lower than the predetermined temperature, the frictional force in the drive part of the robot increases. Accordingly, the possibility of a false detection of a collision increases unless the collision detection sensitivity is changed. In this regard, according to the aspect, the collision detection sensitivity is decreased when the measurement temperature is lower than the predetermined temperature compared to when the measurement temperature is equal to or higher than the predetermined temperature. This makes it possible to prevent an increase in the possibility of a false detection of a collision.

In the aspect, for example, the detection part may detect the collision when a torque difference between an estimated torque and an actual torque of the robot or a disturbance torque directly estimated from the robot exceeds a predetermined threshold, and the detection control part may increase, when the measurement temperature is lower than the predetermined temperature, the predetermined threshold compared to when the measurement temperature is equal to or higher than the predetermined temperature.

According to this aspect, the predetermined threshold is increased when the measurement temperature is lower than the predetermined temperature compared to when the measurement temperature is equal to or higher than the predetermined temperature. Hence, the predetermined threshold is increased even when the measurement temperature becomes lower than the predetermined temperature and the torque difference or the disturbance torque increases. This makes it possible to prevent an increase in the possibility of a false detection of a collision.

In the aspect, for example, the lower the measurement temperature becomes, the more greatly the detection control part may decrease the collision detection sensitivity.

According to this aspect, the lower the measurement temperature becomes, the more greatly the collision detection sensitivity is decreased. Therefore, an increase in the possibility of a false detection of a collision can be prevented even when the temperature of the robot becomes much lower.

In the aspect, for example, the detection part may detect the collision when a torque difference between an estimated torque and an actual torque of the robot or a disturbance torque directly estimated from the robot exceeds a predetermined threshold, and the lower the measurement temperature becomes, the more greatly the detection control part may increase the predetermined threshold.

According to this aspect, the lower the measurement temperature becomes, the more greatly the predetermined threshold is increased. Therefore, the predetermined threshold is further increased even when the temperature of the robot becomes much lower and the torque difference or the disturbance torque further increases. This makes it possible to prevent an increase in the possibility of a false detection of a collision.

In the aspect, the predetermined circumstance may include, for example, a circumstance where a current time is in a predetermined term during which the temperature of the robot is estimated to be low.

According to this aspect, the predetermined circumstance including the circumstance where the current time is in the predetermined term during which the temperature of the robot is estimated to be low can more easily prove that the temperature of the robot is low.

In the aspect, the detection control part may decrease, for example, the collision detection sensitivity before a total running time during which a servomotor of the robot is on reaches a predetermined time after a power source of the robot is turned on or after the servomotor is kept off in a predetermined stop time or longer, compared to the collision detection sensitivity after the total running time reaches the predetermined time.

The temperature of the robot is considered to be maintained in a low state before the total running time during which the servomotor of the robot is on reaches the predetermined time after the power source of the robot is turned on or after the servomotor is kept off in the predetermined stop time or longer. In this case, according to the aspect, the collision detection sensitivity is decreased compared to the collision detection sensitivity after the total running time reaches the predetermined time. This consequently makes it possible to prevent an increase in the possibility of a false detection of a collision.

In the aspect, for example, the detection part may detect the collision when a torque difference between an estimated torque and an actual torque of the robot or a disturbance torque directly estimated from the robot exceeds a predetermined threshold, and the detection control part may change the predetermined threshold to an increased value which is larger than an initial value before the total running time during which the servomotor of the robot is on reaches the predetermined time after the power source of the robot is turned on or after the servomotor is kept off in the predetermined stop time or longer, and may return the predetermined threshold to the initial value after the total running time reaches the predetermined time.

The temperature of the robot is considered to be maintained in the low state before the total running time during which the servomotor of the robot is on reaches the predetermined time after the power source of the robot is turned on or after the servomotor is kept off in the predetermined stop time or longer. In this case, according to the aspect, the predetermined threshold is changed to the increased value which is larger than the initial value before the total running time reaches the predetermined time. This consequently makes it possible to prevent an increase in the possibility of a false detection of a collision. Meanwhile, the predetermined threshold is returned to the initial value after the total running time reaches the predetermined time.

This attains a reduction in the possibility of a detection failure of a collision.

In the aspect, the control device may include, for example, an extension control part which extends the predetermined time when the torque difference or a difference between a value of the disturbance torque and the increased value is smaller than a predetermined value in a predetermined monitoring time before the total running time during which the servomotor is on reaches the predetermined time.

The temperature of the robot is highly likely to be maintained in the low state when the torque difference or the difference between the value of the disturbance torque and the increased value is smaller than the predetermined value in the predetermined monitoring time before the total running time during which the servomotor is on reaches the predetermined time. Here, according to this aspect, the predetermined time is extended and the state of the increased value having been changed from the predetermined threshold is continued. This makes it possible to prevent an increase in the possibility of a false detection of a collision.

In the aspect, the extension control part may determine, for example, that the torque difference or the difference between the value of the disturbance and the increased value is smaller than the predetermined value when a maximal value of the torque difference or the disturbance torque is larger than the initial value and smaller than the increased value.

The temperature of the robot is highly likely to be maintained in the low state when the maximal value of the torque difference or the disturbance torque is larger than the initial value and smaller than the increased value. Here, according to this aspect, the torque difference or the difference between the value of the disturbance torque and the increased value is determined to be smaller than the predetermined value when the maximal value of the torque difference or the disturbance torque is larger than the initial value and smaller than the increased value, and then the predetermined time is extended. Accordingly, the extension of the predetermined time can be easily determined.

A fourth aspect of the present disclosure relates to a robot control device including: a detection part which detects a collision of a robot with an object at a predetermined collision detection sensitivity; a robot control part which performs control of operating the robot, and stopping the robot when the detection part detects the collision; an estimation part which identifies a friction model representing a friction occurring in the robot by using a predetermined matrix to obtain an estimated torque of the robot; an identification progress degree calculation part which calculates a progress degree of identification of the friction model based on the predetermined matrix; and a detection control part which decreases the collision detection sensitivity when the progress degree is small.

A fifth aspect of the present disclosure relates to a robot control method including: a detection step of detecting a collision of a robot with an object at a predetermined collision detection sensitivity; a robot control step of performing control of operating the robot, and stopping the robot when the collision is detected in the detection step; an estimation step of identifying a friction model representing a friction occurring in the robot by using a predetermined matrix to obtain an estimated torque of the robot; an identification progress degree calculation step of calculating a progress degree of identification of the friction model based on the predetermined matrix; and a detection control step of decreasing the collision detection sensitivity when the progress degree is small.

A sixth aspect of the present disclosure relates to a robot control program for causing a computer of a robot to allow: detection of detecting a collision of the robot with an object at a predetermined collision detection sensitivity; robot control of performing control of operating the robot, and stopping the robot when the collision is detected by the detection; estimation of identifying a friction model representing a friction occurring in the robot by using a predetermined matrix to obtain an estimated torque of the robot; identification progress degree calculation of calculating a progress degree of identification of the friction model based on the predetermined matrix; and detection control of decreasing the collision detection sensitivity when the progress degree is small.

In the fourth, the fifth, or the sixth aspect, the collision detection sensitivity is decreased when the progress degree of the identification of the friction model is small. When the progress degree of the identification of the friction model is small, the frictional force in the drive part of the robot cannot be reliably estimated. Thus, the estimated torque of the robot also cannot be correctly obtained. As a result, the possibility of a false detection of a collision increases unless the collision detection sensitivity is changed. In this regard, according to the fourth, the fifth, or the sixth aspect, the collision detection sensitivity is decreased when the progress degree of the identification of the friction model is small. This consequently makes it possible to prevent the increase in the possibility of a false detection of a collision.

In the fourth aspect, for example, the estimation part may identify a friction model $X_k$ expressed by $A_k X_k = B_k$ as the predetermined matrix by using a matrix $A_k$ and a matrix $B_k$ in a time step k, and the identification progress degree calculation part may calculate the progress degree in accordance with a criterion obtained by using diagonal elements in a matrix $A_k^T A_k$.

According to this aspect, the progress degree of the identification of the friction model is calculated in accordance with the criterion obtained by using the diagonal elements in the matrix $A_k^T A_k$. Therefore, the progress degree of the identification of the friction model is easily calculatable.

In the aspect, the criterion may include, for example, one of a trace value, a singular value, an element in a first row and a first column, and the number of conditions, in the matrix $A_k^T A_k$, or a combination of at least two thereof.

According to this aspect, the progress degree of the identification of the friction model is easily calculatable based on one of the trace value, the singular value, the element in the first row and the first column, and the number of conditions, in the matrix $A_k^T A_k$, or a combination of at least two thereof.

In the aspect, for example, the detection control part may decrease, when the progress degree is smaller than a preset value, the collision detection sensitivity compared to when the progress degree is equal to or larger than the preset value.

In this aspect, the collision detection sensitivity is decreased when the progress degree of the identification of the friction model is smaller than the preset value compared to when the progress degree is equal to or larger than the preset value. When the progress degree of the identification of the friction model is smaller than the preset value, the frictional force in the drive part of the robot cannot be reliably estimated. Thus, the estimated torque also cannot be correctly obtained. As a result, the possibility of a false detection of a collision increases unless the collision detection sensitivity is changed. In this regard, according to the aspect, the collision detection sensitivity is decreased when the progress degree of the identification of the friction model is smaller than the preset value compered to when the progress degree is equal to or larger than the preset value.

In the aspect, for example, the detection part may detect the collision when a torque difference between an estimated torque and an actual torque exceeds a predetermined threshold, and the detection control part may increase, when the progress degree is smaller than the preset value, the predetermined threshold compared to when the progress degree is equal to or larger than the preset value.

According to this aspect, the predetermined threshold is increased when the progress degree of the identification of the friction model is smaller than the preset value compared to when the progress degree is equal to or larger than the preset value. Therefore, the predetermined threshold is increased even when the progress degree of the identification of the friction model is smaller than the preset value and the torque difference increases. This consequently makes it possible to prevent an increase in the possibility of a false detection of a collision.

In the aspect, the detection control part may decrease, for example, the collision detection sensitivity when a measurement temperature that is an actually measured temperature of the robot is low.

According to this aspect, the collision detection sensitivity is decreased when the measurement temperature is low. This makes it possible to prevent an increase in the possibility of a false detection of a collision when the temperature of the robot is low.

The embodiments of the present invention are shown in the drawings and described in detail, but they are mere illustrated examples and the implemented examples. Accordingly, the present invention should not be limited thereto. The scope of the present invention should be construed by the languages in the attached claims.

This application is based on Japanese Patent Application No. 2018-146103 filed in Japan Patent Office on Aug. 2, 2018, the entire disclosure of which are hereby incorporated by reference.

INDUSTRIAL APPLICABILITY

A robot control device, a robot control method, and a robot control program according to the present disclosure is applicable to a device for controlling an industrial robot.

The invention claimed is:

1. A robot control device comprising: a processor, the processor being configured to:
   detect a collision of a robot with an object at a predetermined collision detection sensitivity;
   perform control of operating the robot, and stopping the robot when the collision is detected; and
   decrease, a when a predetermined circumstance in which a current time is in a predetermined term during which a temperature of the robot is estimated to be lower than a predetermined temperature is satisfied, the predetermined collision detection sensitivity compared to when the predetermined circumstance is unsatisfied, wherein
   the processor decreases the predetermined collision detection sensitivity before a total running time during which a servomotor of the robot is on reaches a predetermined time after a power source of the robot is turned on or after the servomotor is kept off in a predetermined stop time or longer, compared to the predetermined collision detection sensitivity after the total running time reaches the predetermined time.

2. The robot control device according to claim 1, wherein the predetermined circumstance includes a circumstance in which an actually measured temperature of the robot is lower than the predetermined temperature.

3. The robot control device according to claim 2, wherein the lower the actually measured temperature becomes, the more greatly the processor decreases the predetermined collision detection sensitivity.

4. The robot control device according to claim 3, wherein the processor detects the collision when a torque difference between an estimated torque and an actual torque of the robot or a disturbance torque directly estimated from the robot exceeds a predetermined threshold, and the lower the actually measured temperature becomes, the more greatly the processor increases the predetermined threshold.

5. The robot control device according to claim 1, wherein the processor detects the collision when a torque difference between an estimated torque and an actual torque of the robot or a disturbance torque directly estimated from the robot exceeds a predetermined threshold, and increases, when an actually measured temperature is lower than the predetermined temperature, the predetermined threshold compared to when the actually measured temperature is equal to or higher than the predetermined temperature.

6. The robot control device according to claim 1, wherein the processor detects the collision when a torque difference between an estimated torque and an actual torque of the robot or a disturbance torque directly estimated from the robot exceeds a predetermined threshold, and changes the predetermined threshold to an increased value which is larger than an initial value before the total running time during which the servomotor of the robot is on reaches the predetermined time after the power source of the robot is turned on or after the servomotor is kept off in the predetermined stop time or longer, and returns the predetermined threshold to the initial value after the total running time reaches the predetermined time.

7. The robot control device according to claim 6, wherein the processor extends the predetermined time when the torque difference or a difference between a value of the disturbance torque and the increased value is smaller than a predetermined value in a predetermined monitoring time before the total running time during which the servomotor is on reaches the predetermined time.

8. The robot control device according to claim 7, wherein the processor determines that the torque difference or the difference between the value of the disturbance torque and the increased value is smaller than the predetermined value when a maximal value of the torque difference or the disturbance torque is larger than the initial value and smaller than the increased value.

9. A robot control device comprising a processor, the processor being configured to:
   detect a collision of a robot with an object at a predetermined collision detection sensitivity;
   perform control of operating the robot, and stopping the robot when the collision is detected;
   identify a friction model representing a friction occurring in the robot by using a predetermined matrix to obtain an estimated torque of the robot;
   calculate a progress degree of identification of the friction model based on the predetermined matrix; and
   decrease the predetermined collision detection sensitivity when the progress degree is small equal to or smaller than a preset value, wherein the processor identifies a friction model $X_k$ expressed by $A_k X_k = B_k$ as the predetermined matrix by using a matrix $A_k$ and a matrix $B_k$ in a time step k, and
   calculates the progress degree in accordance with a criterion obtained by using diagonal elements in a matrix $A_k^T A_k$.

10. The robot control device according to claim 9, wherein
   the criterion includes one of a trace value, a singular value, an element in a first row and a first column, and a number of conditions, in the matrix $A_k^T A_k$, or a combination of at least two thereof.

11. The robot control device according to claim 9, wherein
   the processor detects the collision when a torque difference between an estimated torque and an actual torque exceeds a predetermined threshold, and
   increases, when the progress degree is smaller than the preset value, the predetermined threshold compared to when the progress degree is equal to or larger than the preset value.

12. The robot control device according to claim 9, wherein
   the processor decreases the predetermined collision detection sensitivity when an actually measured temperature of the robot is lower than the predetermined temperature.

13. A robot control method comprising:
   a detection step of detecting a collision of a robot with an object at a predetermined collision detection sensitivity;
   a robot control step of performing control of operating the robot, and stopping the robot when the collision is detected in the detection step; and
   a detection control step of decreasing, when a predetermined circumstance in which a current time is in a predetermined term during which a temperature of the robot is estimated to be lower than a predetermined temperature is satisfied, the predetermined collision detection sensitivity compared to when the predetermined circumstance is unsatisfied, wherein
   the detection control step decreases the predetermined collision detection sensitivity before a total running time during which a servomotor of the robot is on reaches a predetermined time after a power source of the robot is turned on or after the servomotor is kept off in a predetermined stop time or longer, compared to the predetermined collision detection sensitivity after the total running time reaches the predetermined time.

14. A robot control method comprising:
   a detection step of detecting a collision of a robot with an object at a predetermined collision detection sensitivity;
   a robot control step of performing control of operating the robot, and stopping the robot when the collision is detected in the detection step;
   an estimation step of identifying a friction model representing a friction occurring in the robot by using a predetermined matrix to obtain an estimated torque of the robot;
   an identification progress degree calculation step of calculating a progress degree of identification of the friction model based on the predetermined matrix; and
   a detection control step of decreasing the predetermined collision detection sensitivity when the progress degree is equal to or smaller than a preset value, wherein
   the estimation step identifies a friction model $X_k$ expressed by $A_k X_k = B_k$ as the predetermined matrix by using a matrix $A_k$ and a matrix $B_k$ in a time step k, and calculates the progress degree in accordance with a criterion obtained by using diagonal elements in a matrix $A_k^T A_k$.

15. A non-transitory computer readable medium storing a robot control program for causing a computer of a robot to execute:
   detection of detecting a collision of the robot with an object at a predetermined collision detection sensitivity;
   robot control of performing control of operating the robot, and stopping the robot when the collision is detected by the detection; and
   detection control of decreasing, when a predetermined circumstance in which a current time is in a predetermined term during which a temperature of the robot is estimated to be lower than a predetermined temperature is satisfied, the predetermined collision detection sensitivity compared to when the predetermined circumstance is unsatisfied wherein
   the detection control decreases the predetermined collision detection sensitivity before a total running time during which a servomotor of the robot is on reaches a predetermined time after a power source of the robot is turned on or after the servomotor is kept off in a predetermined stop time or longer, compared to the predetermined collision detection sensitivity after the total running time reaches the predetermined time.

16. A non-transitory computer readable medium storing a robot control program for causing a computer of a robot to execute:
   detection of detecting a collision of the robot with an object at a predetermined collision detection sensitivity;
   robot control of performing control of operating the robot, and stopping the robot when the collision is detected by the detection;
   estimation of identifying a friction model representing a friction occurring in the robot by using a predetermined matrix to obtain an estimated torque of the robot;
   identification progress degree calculation of calculating a progress degree of identification of the friction model based on the predetermined matrix; and detection control of decreasing the predetermined collision detection sensitivity when the progress degree is equal to or smaller than a preset value, wherein
the estimation identifies a friction model $X_k$ expressed by $A_k X_k = B_k$ as the predetermined matrix by using a matrix $A_k$ and a matrix $B_k$ in a time step k, and calculates the progress degree in accordance with a criterion obtained by using diagonal elements in a matrix $A_k^T A_k$.

* * * * *